United States Patent
Battle et al.

(10) Patent No.: US 9,223,868 B2
(45) Date of Patent: Dec. 29, 2015

(54) DERIVING AND USING INTERACTION PROFILES

(75) Inventors: Alexis Jane Battle, Redwood City, CA (US); David Ariel Cohn, Palo Alto, CA (US); Carrie Elizabeth Grimes, Palo Alto, CA (US); John Ogden Lamping, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/308,770

(22) Filed: Dec. 1, 2011

(65) Prior Publication Data

US 2015/0161255 A1   Jun. 11, 2015

Related U.S. Application Data

(63) Continuation of application No. 13/035,432, filed on Feb. 25, 2011, now abandoned, which is a continuation of application No. 10/878,926, filed on Jun. 28, 2004, now abandoned.

(51) Int. Cl.
*G06F 17/30* (2006.01)
*H04L 29/08* (2006.01)

(52) U.S. Cl.
CPC .......... *G06F 17/30864* (2013.01); *H04L 67/02* (2013.01); *H04L 67/22* (2013.01); *H04L 67/30* (2013.01)

(58) Field of Classification Search
CPC ................... G06F 17/30648; G06F 17/30864; G06F 17/30867
USPC ................................................ 707/722–734
See application file for complete search history.

(56) References Cited

U.S. PATENT DOCUMENTS

| | | | |
|---|---|---|---|
| 5,826,260 | A | 10/1998 | Byrd et al. |
| 5,897,627 | A | 4/1999 | Leivian et al. |
| 6,006,221 | A | 12/1999 | Liddy et al. |
| 6,006,222 | A | 12/1999 | Culliss |
| 6,014,665 | A | 1/2000 | Culliss |
| 6,078,916 | A | 6/2000 | Culliss |

(Continued)

FOREIGN PATENT DOCUMENTS

WO      01/80070 A1   10/2001
WO      01/82134 A    11/2001

OTHER PUBLICATIONS

Spiliopoulou et al. Jun. 11, 2002, Improving the Effectiveness of a Web Site with Web Usage Mining, pp. 142-160.*

(Continued)

*Primary Examiner* — Neveen Abel Jalil
*Assistant Examiner* — Matthew Ellis
(74) *Attorney, Agent, or Firm* — Fish & Richardson P.C.

(57) ABSTRACT

Systems and methods for deriving and using an interaction profile are described. In one described method, a plurality of metrics indicating a level of satisfaction for search results is determined. The metrics comprise at least one of click-duration data, multiple-click data, and query-refinement data. The values of the metrics for a plurality of instances of an object, such as search results from a search engine, are determined. An interaction profile for the object, based at least in part on the values of the metrics for a plurality of instances of the first object, is then determined. This interaction profile may be used in a variety of ways, such as determining the quality of ranking algorithms and detecting undesirable search results.

14 Claims, 6 Drawing Sheets

(56) References Cited

U.S. PATENT DOCUMENTS

| | | | |
|---|---|---|---|
| 6,088,692 A | 7/2000 | Driscoll | |
| 6,169,986 B1 | 1/2001 | Bowman et al. | |
| 6,182,068 B1 | 1/2001 | Culliss | |
| 6,243,076 B1 | 6/2001 | Hatfield | |
| 6,285,999 B1 | 9/2001 | Page | |
| 6,311,175 B1 | 10/2001 | Adriaans et al. | |
| 6,397,211 B1 | 5/2002 | Cooper | |
| 6,411,950 B1 | 6/2002 | Moricz et al. | |
| 6,463,430 B1 | 10/2002 | Brady et al. | |
| 6,519,585 B1 | 2/2003 | Kohli | |
| 6,523,020 B1 | 2/2003 | Weiss | |
| 6,539,377 B1 | 3/2003 | Culliss | |
| 6,546,388 B1 | 4/2003 | Edlund et al. | |
| 6,546,389 B1 | 4/2003 | Agrawal et al. | |
| 6,564,202 B1 | 5/2003 | Schuetze et al. | |
| 6,651,054 B1 | 11/2003 | De Judicibus | |
| 6,671,711 B1 | 12/2003 | Pirolli et al. | |
| 6,675,159 B1 | 1/2004 | Lin et al. | |
| 6,701,309 B1 | 3/2004 | Beeferman et al. | |
| 6,714,929 B1 | 3/2004 | Micaelian et al. | |
| 6,718,363 B1 | 4/2004 | Ponte | |
| 6,732,088 B1 | 5/2004 | Glance | |
| 6,738,764 B2 | 5/2004 | Mao et al. | |
| 6,751,611 B2 | 6/2004 | Krupin et al. | |
| 6,772,150 B1* | 8/2004 | Whitman et al. | 707/721 |
| 6,782,390 B2 | 8/2004 | Lee et al. | |
| 6,799,176 B1 | 9/2004 | Page | |
| 6,829,599 B2 | 12/2004 | Chidlovskii | |
| 6,856,957 B1 | 2/2005 | Dumoulin | |
| 6,981,040 B1* | 12/2005 | Konig et al. | 709/224 |
| 7,031,961 B2 | 4/2006 | Pitkow et al. | |
| 7,058,628 B1 | 6/2006 | Page | |
| 7,065,524 B1 | 6/2006 | Lee | |
| 7,117,207 B1* | 10/2006 | Kerschberg et al. | 1/1 |
| 7,219,073 B1* | 5/2007 | Taylor et al. | 705/26.62 |
| 7,222,127 B1 | 5/2007 | Bem et al. | |
| 7,293,017 B2 | 11/2007 | Hurst-Hiller et al. | |
| 7,383,258 B2 | 6/2008 | Harik et al. | |
| 7,437,349 B2 | 10/2008 | Basu et al. | |
| 7,516,118 B1 | 4/2009 | Badros et al. | |
| 7,523,031 B1 | 4/2009 | Wakai et al. | |
| 7,565,345 B2 | 7/2009 | Bailey et al. | |
| 7,617,205 B2 | 11/2009 | Bailey et al. | |
| 7,636,714 B1 | 12/2009 | Lamping et al. | |
| 7,870,147 B2 | 1/2011 | Bailey et al. | |
| 8,954,420 B1* | 2/2015 | Khan et al. | 707/722 |
| 2002/0002438 A1 | 1/2002 | Ohmura et al. | |
| 2002/0016736 A1 | 2/2002 | Cannon et al. | |
| 2002/0083067 A1 | 6/2002 | Tamayo et al. | |
| 2002/0099723 A1* | 7/2002 | Garcia-Chiesa | 707/200 |
| 2002/0173971 A1* | 11/2002 | Stirpe et al. | 705/1 |
| 2003/0014399 A1 | 1/2003 | Hansen et al. | |
| 2003/0018626 A1* | 1/2003 | Kay et al. | 707/3 |
| 2003/0061214 A1 | 3/2003 | Alpha | |
| 2003/0078914 A1* | 4/2003 | Witbrock | 707/3 |
| 2003/0093408 A1 | 5/2003 | Brown et al. | |
| 2003/0115333 A1* | 6/2003 | Cohen et al. | 709/227 |
| 2003/0135413 A1 | 7/2003 | Nishi et al. | |
| 2003/0144994 A1 | 7/2003 | Wen et al. | |
| 2003/0172075 A1 | 9/2003 | Reisman | |
| 2003/0210666 A1 | 11/2003 | Trossen et al. | |
| 2003/0212666 A1 | 11/2003 | Basu et al. | |
| 2003/0212673 A1* | 11/2003 | Kadayam et al. | 707/3 |
| 2003/0217052 A1 | 11/2003 | Rubenczyk et al. | |
| 2003/0220912 A1* | 11/2003 | Fain et al. | 707/3 |
| 2004/0068486 A1 | 4/2004 | Chidlovskii | |
| 2004/0083211 A1 | 4/2004 | Bradford | |
| 2004/0186827 A1 | 9/2004 | Anick et al. | |
| 2004/0199419 A1 | 10/2004 | Kim et al. | |
| 2004/0199498 A1 | 10/2004 | Kapur et al. | |
| 2004/0236721 A1 | 11/2004 | Pollack | |
| 2004/0254920 A1 | 12/2004 | Brill et al. | |
| 2004/0260621 A1 | 12/2004 | Foster et al. | |
| 2005/0027691 A1 | 2/2005 | Brin et al. | |
| 2005/0033732 A1* | 2/2005 | Chang et al. | 707/2 |
| 2005/0044224 A1 | 2/2005 | Jun et al. | |
| 2005/0050016 A1* | 3/2005 | Stanoi et al. | 707/3 |
| 2005/0055341 A1 | 3/2005 | Haahr et al. | |
| 2005/0071337 A1 | 3/2005 | Baranczyk et al. | |
| 2005/0097092 A1 | 5/2005 | Annau et al. | |
| 2005/0125215 A1 | 6/2005 | Wu et al. | |
| 2005/0144158 A1 | 6/2005 | Capper et al. | |
| 2005/0149499 A1 | 7/2005 | Franz et al. | |
| 2005/0149504 A1* | 7/2005 | Ratnaparkhi | 707/3 |
| 2005/0154716 A1* | 7/2005 | Watson et al. | 707/3 |
| 2005/0159921 A1* | 7/2005 | Louviere et al. | 702/181 |
| 2005/0198068 A1 | 9/2005 | Mukherjee et al. | |
| 2005/0210024 A1* | 9/2005 | Hurst-Hiller et al. | 707/5 |
| 2005/0216454 A1 | 9/2005 | Diab et al. | |
| 2005/0216457 A1 | 9/2005 | Walther et al. | |
| 2005/0228817 A1 | 10/2005 | Hochberg et al. | |
| 2005/0256848 A1 | 11/2005 | Alpert et al. | |
| 2006/0018551 A1 | 1/2006 | Patterson | |
| 2006/0023005 A1 | 2/2006 | Katsuyama et al. | |
| 2006/0026013 A1 | 2/2006 | Kraft | |
| 2006/0031214 A1 | 2/2006 | Solaro et al. | |
| 2006/0041560 A1 | 2/2006 | Forman et al. | |
| 2006/0074883 A1 | 4/2006 | Teevan et al. | |
| 2006/0218475 A1 | 9/2006 | Bodin et al. | |
| 2006/0230022 A1 | 10/2006 | Bailey | |
| 2007/0100804 A1 | 5/2007 | Cava | |
| 2007/0106937 A1 | 5/2007 | Cucerzan et al. | |
| 2011/0060736 A1 | 3/2011 | Bailey et al. | |

OTHER PUBLICATIONS

Office Action issued in U.S. Appl. No. 12/244,491 on Mar. 10, 2014, 17 pages.
U.S. Appl. No. 10/668,721, filed Sep. 22, 2003, Haahr et al.
U.S. Appl. No. 10/676,571, filed Sep. 30, 2003, Harik et al.
U.S. Appl. No. 10/734,584, filed Dec. 15, 2003, Bem et al.
U.S. Appl. No. 10/878,926, filed Jun. 28, 2004, Battle et al.
U.S. Appl. No. 11/090,302, filed Mar. 28, 2005, Lamping et al.
U.S. Appl. No. 12/244,491, filed Oct. 2, 2008, Bailey et al.
U.S. Appl. No. 13/035,432, filed Feb. 25, 2011, Battle et al.
"How the Vivisimo Clustering Engine Works", Vivisimo, Inc., 2003, 2 pages.
Boyan, J.A. et al., "Learning Evaluation Functions for global Optimization and Boolean Satisfiability", 1998, [online] Retrieved from the Internet<URL:http://www.autonlab.org/autonweb/14682/version/2/part/5/data/boyan-learning.pdf?branch=main&language=en>.
Chang, D. T., "HieNet: A User-Centered Approach for Automatic Link Generation," ACM, Hypertext '93 Proceedings, Nov. 1993, pp. 145-158.
Crestani, F. et al., "Is This Document Relevant?. . . Probably": A Survey of Probabilistic Models in Information Retrieval, ACM Computing Surveys, vol. 30., No. 4, Dec. 1998, pp. 528-552.
Cui, Huang et al., "Probabilistic Query Expansion Using Query Logs", Proceedings of the 11$^{th}$ International Conference on the World Wide Web, May 7-11, 2002, Honolulu, HI, 8 pages.
Dong Wong, PCT International Search Report and Written Opinion, PCT/US05/10681, Oct. 18, 2006, 7 pages.
Friedman, J. et al., "Additive Logistic Regressing: A Statistical View of Boosting," Department of Statistics, Stanford University Technical Report, Aug. 20, 1009, pp. 1-45.
Harmann, D., "Towards interactive query expansion," Proceedings of the 11$^{th}$ Annual International ACM-SIGIR Conference on Research and Development in Information Retrieval [Online] 1998, pp. 321-331, XP002527677 Grenoble, France, ISBN: 2-7061-0309-4, Retrieved from the Internet: URL:http://portal.acm.org/citation.cfm?id=62437.62469. [retrieved on May 12, 2009] *the whole document.
Jaczynski, M. et al., "Broadway: A Case-Based System for Cooperative Information Browsing on the World-Wide-Web," INRIA Sophia-Antipolis, Action AID, 12 pages.
Joachims, T. et al., "Evaluating Retrieval Performance Using Clickthrough Data," Department of Computer Science, Cornell University, 2003; pp. 1-18.

(56) References Cited

OTHER PUBLICATIONS

Joachims, T. et al., "Optimizing Search Engines Using Clickthrough Data," Department of Computer Science, Cornell University, 2002; pp. 1-10.
Lee W. Young, PCT International Search Report and Written Opinion, PCT/US/06/09076, Sep. 20, 2007, 8 pages.
Magennis et al., "The Potential and Actual Effectiveness of Interactive Query Expansion," Proceedings of the 20*th* Annual International ACM=SIGIR Conference on Research and Development in Information Retrieval, Philadelphia, PA, Jul. 27-31, 1997; [Annual International ACM=SIGIR Conference on Research and Development in Information Retrieval, Jul. 27, 1997, pp. 324-332, XP000782015, ISBN: 978-0-89791-836-7, *the whole document.*
Ng, A. et al., "On Discriminative vs. Generative Classifiers: A Comparison of Logistic Regression and Naive Bayes," Dietterich (eds.), Advances in Neural Information Processing Systems 14, Cambridge, MA, MIT Press, 2002, pp. 841-848.
Weiss et al.: Rule-based Machine Learning Methods for Functional Prediction, Journal of AI Research, vol. 3, Dec. 1995, pp. 383-403.
Zaine, Osmar et al., "Finding Similar Queries to Satisfy Searches Based on Query Traces", 2002, OOIS 2002 Workshops, LNCS 2462, pp. 207-216.
Agnes Wittmann-Regis, International Preliminary Report on Patentability for PCT/US2006/009076, dated May 15, 2007 (6 pages).
Agnes Wittmann-Regis, International Preliminary Report on Patentability for PCT/US2005/010681, dated Oct. 18, 2006 (4 pages).
Australian Office Action for Application 2006229761, dated Oct. 21, 2010, 3 pages.
Canadian Office Action for Application No. 2,603,718 dated Jul. 6, 2011, 3 pages.
Office Action for Application No. 2,603,718, dated Mar. 13, 2012, 3 pages.
Chinese Office Action for Application No. 200580049822.8, dated May 8, 2009, 15 pages.
Chinese Office Action for Application No. 200580049822.8, dated May 26, 2010, 14 pages.
Chinese Office Action for Application No. 200680017106.6, dated Aug. 28, 2009 (7 pages).
Communication Pursuant to Article 94(3) EPC for Application No. 05731419.7, mailed Mar. 24, 2011, 6 pages.
Extended European Search Report , European Application No. 11183625.0-2201, dated Dec. 8, 2011, 6 pages.
Office Action for Application No. 05731419.7-2201, Reference EPP98293, mailed Sep. 23, 2009.
Supplementary European Search Report for Application No. 05731419.7-2201, Reference EPP98293, mailed May 28, 2009, 4 pages.
Supplementary European Search Report, EP06738165.7, dated Jan. 20, 2010.
Japanese Office Action for Application No. 2008-504089 dated Jun. 21, 2011 (untranslated), 3 pages.
Korean Office Action for Application No. 2007-7024804, dated Jun. 18, 2012, 3 pages.
Notice of Allowance issued in U.S. Appl. No. 12/194,431, dated Aug. 8, 2011 (16 pages).
Office Action issued in U.S. Appl. No. 10/878,926, dated Aug. 14, 2008 (10 pages).
Office Action issued in U.S. Appl. No. 10/878,926, dated Dec. 12, 2006 (16 pages).
Office Action issued in U.S. Appl. No. 10/878,926, dated Jul. 17, 2007 (22 pages).
Office Action issued in U.S. Appl. No. 10/878,926, dated Sep. 21, 2009 (10 pages).
Office Action issued in U.S. Appl. No. 10/878,926, dated Jan. 29, 2010 (17 pages).
Office Action issued in U.S. Appl. No. 11/096,198, dated Mar. 5, 2009 (26 pages).
Office Action issued in U.S. Appl. No. 12/194,431, dated Feb. 4, 2011 (15 pages).
Office Action issued in U.S. Appl. No. 12/244,491, mailed Mar. 24, 2011 (13 pages).
Office Action issued in U.S. Appl. No. 12/244,491, dated Aug. 11, 2011 (13 pages).
Office Action issued in U.S. Appl. No. 12/244,491 on Jul. 15, 2013 (13 pages).
Office Action issued in U.S. Appl. No. 12/244,491 on Sep. 18, 2013 (15 pages).
Office Action issued in U.S. Appl. No. 13/035,432, dated Jun. 2, 2011 (15 pages).

* cited by examiner

DERIVING AND USING INTERACTION PROFILES

CROSS-REFERENCE TO RELATED APPLICATIONS

This application is a continuation application of and claims priority to U.S. application Ser. No. 13/035,432, filed on Feb. 25, 2011 and entitled "SYSTEMS AND METHODS FOR DERIVING AND USING AN INTERACTION PROFILE," which is a continuation application of and claims priority to U.S. application Ser. No. 10/878,926, filed on Jun. 28, 2004 and entitled "SYSTEMS AND METHODS FOR DERIVING AND USING AN INTERACTION PROFILE," the contents of both of which are incorporated herein by reference.

FIELD OF THE INVENTION

The present invention relates generally to systems and methods for data analysis. The present invention relates particularly to systems and methods for deriving and using an interaction profile, such as a click profile.

BACKGROUND

When a user performs a search on a commercial search engine and then clicks on the results, the commercial search engine may gather information about which results were presented to the user and about the particular results the user clicked. The commercial search engine operators may then use this information to evaluate the quality of the search, to improve the search, and to perform machine learning to improve the quality of the search results.

For example, if a commercial search engine has a new algorithm for determining search results for a search query, the commercial search engine may present results from the new algorithm, and compare the click rate of the results from the new algorithm to the click rate of the results from the old algorithm. A higher click rate on results from the new algorithm suggests that it is superior. Examples of such approaches may be found in J. Boyan, D. Freitag, and T. Joachims, *A Machine Learning Architecture for Optimizing Web Search Engines*, Proceedings of the AAA1 Workshop on Internet Based Information Systems, 1996.

Unfortunately, users cannot always determine if a result is "good," or how good it is, without clicking on it. Users may click on a result by mistake. Moreover, users sometime click on results that are not superior, and in many cases, inferior, to other results. For example, the title and snippets associated with some search results may mislead users and result in an artificially-high click rate. The fact that users are misled may be accidental or deliberate. For example, some webmasters adjust their pages to make them appear artificially good in search result lists, in order to draw additional traffic to their sites. For example, some web sites extract information from a search query and insert the information into the result title or snippet, making the result appear as if it closely matches the search query. Thus, evaluating the quality of search results based solely on which results in a result set are selected by users (or "clicked on") may not yield an effective evaluation.

Some search engines associated with electronic-commerce sites have devised methods of tracking user behavior in an attempt to more accurately rank search results. For example, some commercial shopping sites track a user's behavior by determining whether they buy particular products when they are shown to the user. If the purchase rate increases, the ranking of the result is increased. This approach, too, has limited effectiveness. For example, this approach may not be available, to a search engine not associated with an electronic-commerce site, and access to such data may not be available. Moreover, for many searches, a purchase may not constitute a good indicator of user satisfaction.

SUMMARY

Embodiments of the present invention provide systems and methods for deriving an interaction profile, such as a click profile. In one embodiment of the present invention, a plurality of metrics indicating a level of satisfaction for search results is determined. The metrics may comprise at least one of click-duration data, multiple-click data, and query-refinement data. The values of the metrics for a plurality of instances of an object, such as search results from a search engine, are determined. An interaction profile for the object, based at least in part on the values of the metrics for a plurality of instances of the first object, is then determined. This interaction profile may be used in a variety of ways, such as determining the quality of ranking algorithms, optimizing algorithms, and detecting undesirable search results. In another embodiment, a computer-readable medium (such as, for example random access memory or a computer disk) comprises code for carrying out such a method.

These example embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Introduction

Embodiments of the present invention provide systems and methods for deriving and using an interaction profile, such as a click profile. There are multiple embodiments of the present invention. By way of introduction and example, in one exemplary embodiment of the present invention, a search-engine provider wishes to consider a new ranking algorithm for implementation. The search-engine provider may carry out testing of the new algorithm whereby persons input search queries into a search-engine interface that then provides the search queries to a search engine employing the new algorithm, and the search engine returns search results resulting from the new algorithm to the querying person. The querying person then interacts with the search results, and the query, results, and interaction, and other relevant data may be recorded in a log file. After a sufficient number of log entries have been accumulated in the log file relative to the new search algorithm for one or more users, a software application extracts information regarding user behavior from the log file for the new algorithm. The information includes on which results in a result set a user clicked, how long the user remained on the target web site, and other user-behavior information. This information can constitute a click profile for the new search algorithm. The software application may also extract similar data from the same or another log file associated with a second; different ranking-algorithm (for example, an algorithm previously used by the search engine, or another new algorithm under consideration for implementation). Such data can constitute a click profile for the second algorithm. The analyzer software application may then compare the click profile associated with the first ranking algorithm with the click profile associated with the second ranking algorithm to determine the relative quality of the first and second algorithms. The relative quality comprises an attribute indicating the nature of one of the algorithms relative to the other, or relative to a chosen object, expectation, or standard. This relative quality determination may be done to determine which of the two algorithms may be of higher quality. An example of a higher-quality algorithm may be one that produces better results in response to search queries.

This introduction is given to introduce the reader to the general subject matter of the application. By no means is the invention limited to such subject matter. Example embodiments are described below.

System Architecture

Figure 1:
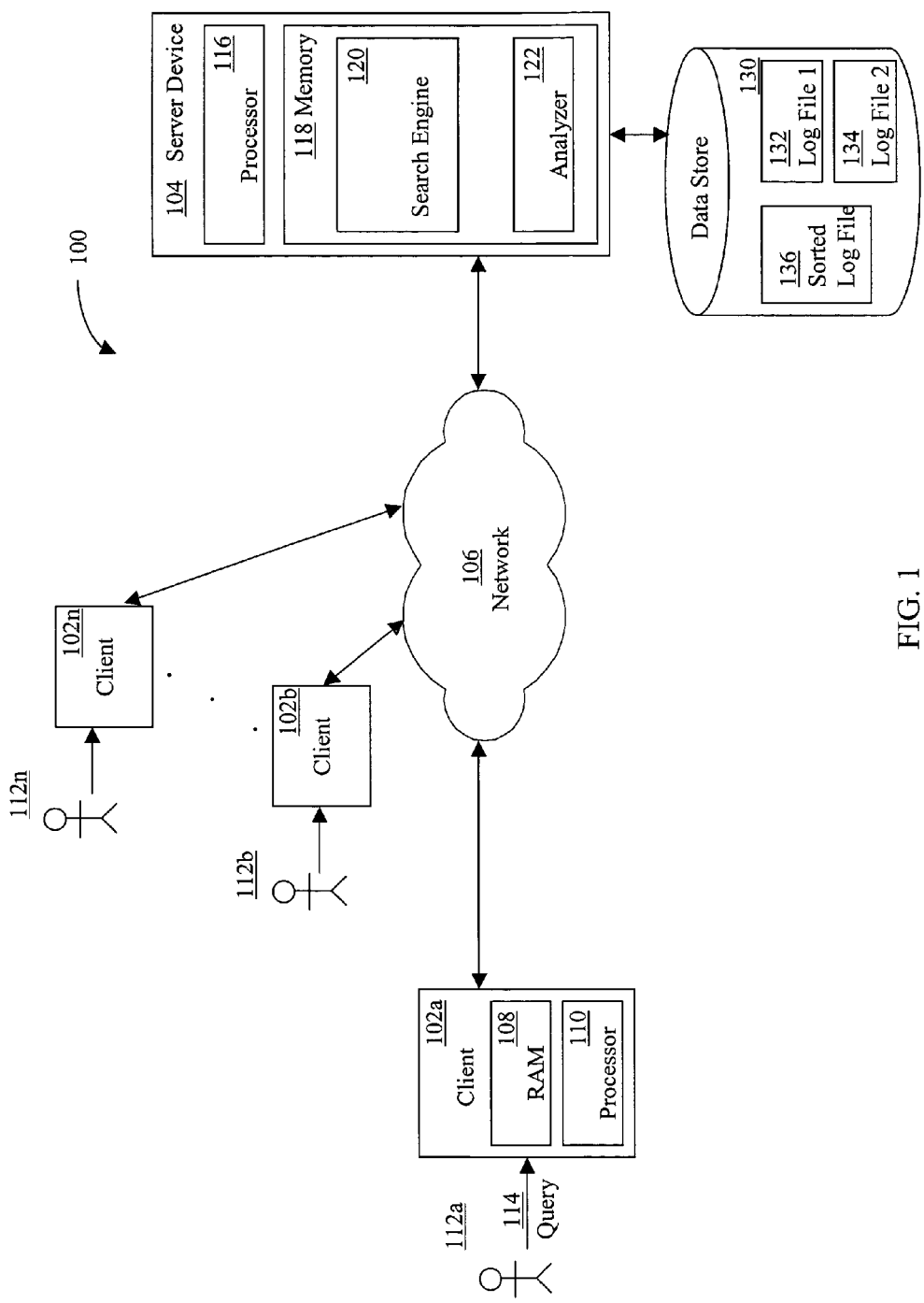
FIG. 1 is a block diagram illustrating an exemplary environment in which one embodiment of the present invention may operate.

Referring now to the drawings in which like numerals indicate like elements throughout the several figures, FIG. 1 is a diagram illustrating an exemplary environment in which one embodiment of the present invention may operate. The present invention may operate, and be embodied in, other environments as well.

The system 100 shown in FIG. 1 comprises multiple client devices 102*a-n* in communication with a server device 104 over a network 106. The network 106 shown comprises the Internet. In other embodiments, other networks, such as an intranet, local area network, or wide area network may be used. Moreover, methods according to the present invention may operate within a single client or server device.

The client devices 102*a-n* shown each comprises a computer-readable medium. The computer-readable medium shown comprises a random access memory (RAM) 108 coupled to a processor 110. The processor 110 executes computer-executable program instructions stored in memory 108. Such processors may comprise a microprocessor, an Application-specific integrated Circuit (ASIC), a state machine, or other processor. Such processors comprise, or may be in communication with, media, for example computer-readable media, which stores instructions that, when executed by the processor, cause the processor to perform the steps described herein.

Embodiments of computer-readable media may comprise an electronic, optical, magnetic, or other storage or transmission device capable of providing a processor, such as the processor 110 of client 102*a*, with computer-readable instructions. Other examples of suitable media may comprise a floppy disk, Compact Disk Read Only Memory (CD-ROM), magnetic disk, memory chip, ROM, Random Access Memory (RAM), an ASIC, a configured processor, all optical media, all magnetic tape or other magnetic media, or any other suitable medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Peri, and JavaScript.

Client devices 102*a-n* may also comprise a number of external or internal devices such as a mouse, a CD-ROM, a keyboard, a display, or other input or output devices. Examples of client devices 102*a-n* are personal computers, digital assistants, personal digital assistants, cellular phones, mobile phones, smart phones, pagers, digital tablets, laptop computers, Internet appliances, and other processor-based devices. In general, a client device 102*a-n* may be any type of processor-based platform that is connected to a network 106 and that interacts with one or more application programs. Client devices 102*a-n* may operate on any suitable operating system, such as Microsoft® Windows® or Linux, capable of supporting one or more client application programs. For example, the client device 102*a* shown comprises a personal computer executing client application programs, also known as client applications. The client applications can be contained in memory 108 and can comprise, for example, a word processing application, a spreadsheet application, an e-mail application, a media player application, an instant messenger application, a presentation application, an Internet browser application, a calendar/organizer application, and any other application or computer program capable of being executed by a client device.

Through the client devices 102*a-n*, users 112*a-n* can communicate over the network 106 with each other and with other systems and devices coupled to the network 106. As shown in FIG. 1, a server device 104 is also coupled to the network 106. In the embodiment shown, a user 112*a-n* can generate a search query 114 at a client device 102*a-n*. The client device 102*a-n* transmits the query 114 to the server device 104 via the network 106. For example, a user 112*a* types a textual search query into a query field of a web page of a search engine interface displayed on the client device 102*a*, which is then transmitted via the network 106 to the server device 104. In the embodiment shown, a user 112*a-n* inputs a search query 114 at a client device 102*a-n*, which transmits an associated search query signal corresponding to the search query to the server device 104. The search query may be transmitted directly to the server device 104 as shown. The query signal may instead be sent to a proxy server (not shown), which then transmits the query signal to server device 104. Such an embodiment may be utilized, for example, to generate a log of a user's behavior while accessing the network 106.

The server device 104 shown comprises a server executing a search engine application program, such as the Google™ search engine. Similar to the client devices 102*a-n*, the server device 104 shown comprises a processor 116 coupled to a computer-readable memory 118. Server device 104, depicted as a single computer system, may be implemented as a network of computer processors. Examples of a server device 104 are servers, mainframe computers, networked computers, a processor-based device, and similar types of systems and devices. Client processors 110 and the server processor 116 can be any of a number of well known computer processors, such as processors from Intel Corporation of Santa Clara, Calif. and Motorola Corporation of Schaumburg, Ill. Although the processes described herein are described in relation to the client and server, a client may perform any or all of the processes described as being performed by a server. Similarly, a server may perform any or all of the processes described herein as being performed by a client.

Memory 118 contains the search-engine application program, also known as a search engine 120. The search engine 120 locates relevant information in response to a search query from a user 112a-n.

The server device 104 also includes an analyzer application 122. The analyzer application, or analyzer, comprises an application that may analyze data. The analyzer 122 shown in FIG. 1 comprises a software application that receives and analyzes data. The analyzer 122 shown reads log-file information and derives aggregated (and non-aggregated) data based on the log-file information. Although the analyzer 122 is depicted as an application program executing on the server device 104, in other embodiments, the analyzer 122 may comprise various other hardware and software and may execute independently of the server device 104. The analyzer 122 shown in FIG. 1 may comprise computer code for carrying out all or some of the methods ascribed to the analyzer below, including those described with reference to FIGS. 2-4.

The server device 104, or related device, or related device, has previously performed a crawl of the network 106 to locate articles, such as web pages, stored at other devices or systems connected to the network 106, and indexed the articles in memory 118 or on another data storage device, such as data store 130.

The data store 130 can be any type of suitable computer-readable media and can be integrated with the server device 104, such as a hard drive, or external to the client server device 104, such as an external hard drive or on another data storage device accessed through the network 106. The data store 130 may comprise any one or combination of methods for storing data, including without limitation, arrays, hash tables, lists, and pairs.

Articles comprise, for example, data elements from a database, web pages of various formats, such as Hypertext Markup Language (HTML), eXtensible Markup Language (XML), eXtensible Hypertext Markup Language (XHTML), Portable Document Format (PDF) files, and word processor, database, and application program document files, audio, video, or any other documents or information of any type whatsoever made available, on a network (such as the Internet), a personal computer, or other computing or storage means. The embodiments described herein are described generally in relation to HTML files or documents, but embodiments may operate on any suitable type of article.

The search engine 120 responds to the query signal by generating and returning a set of relevant search results. Typically, search results are returned as an ordered result set formatted as a list to client device 102a-n from which the search query originated. The result set comprises one or more search results, and the search results may comprise one or more article identifiers. An article identifier may be, for example, a Uniform Resource Locator (URL), a file name, a link, an icon, a path for a local file, an index in a database, an indicator of a single destination, item, or location, or any other suitable article identifier. The result set may include additional elements as well, including, for example, a snippet associated with each search result.

The search engine 120 also comprises a web server application. The web server responds to Hypertext Transfer Protocol (HTTP) requests by executing code. The web server also stores one or more logs of activity on the web server. The data is typically written to a file, database, or other data store, and stored in a binary format. The log, or log file, may be stored, for example, in data store 130. The logs typically include information regarding activity such as access and errors. For example, an access (or transfer) log includes an entry for each access of the web site. Each entry includes an Internet protocol (EP) address of the requestor, the date and time; the URL, the method of access, the client (e.g., the browser application), the status, cookie information, and other information about the access. By analyzing a series of entries, patterns of usage can be identified. For example, in an HTTP request directed to the search engine 122, the URL includes information that can be used to reconstruct the search query 114 entered by the user. In the embodiment shown in FIG. 1, data store 130 comprises two log files, Log File 1 132 and Log File 2 134.

It should be noted that embodiments of the present invention may comprise systems having different architecture than that which is shown in FIG. 1. For example, in some systems according to the present invention, server device 104 and server device 122 may comprise a single physical or logical server. The system 100 shown in FIG. 1 is merely exemplary, and is used to explain the exemplary methods shown in FIGS. 2-4.

Example Methods

Various methods according to the present invention may be implemented in the environment shown in FIG. 1 and other environments. Methods according to the present invention may be implemented by, for example, a processor-executable program code stored on a computer-readable medium. Example methods according to the present invention are described below.

The example methods described below include methods of competitive evaluation of ranking functions as a function of user behavior (such as clicks or other interactions by the user with search results). The sections below entitled "Determining Ranking Algorithm Quality By Comparing Interaction Profiles of Ranking Algorithms" and "Comparing Algorithms on Different Classes of Queries" include descriptions of such methods. Example methods described below also include methods of evaluation of a search result across queries to determine the probable quality of a particular object, such as a search result. The sections below entitled "Evaluation of a Particular Class of Search Result" and "Manipulated Article Identification" include descriptions of such methods.

These two types of methods, and other types of methods, are described throughout the description. First, log files and interaction profiles are introduced, and an example method of deriving an interaction profile is described.

Introduction to Log Files

Activity on the search engine 122 is tracked and stored in a log file. Creation and analysis of log files will be described briefly herein with reference to the exemplary process shown in FIG. 2. A log file may include, for example, user-behavior data, or data indicating a user's behavior relative to an object, such as search results returned to the user by a search engine in response to the user's query. User-behavior data may comprise, for example, data reflecting actions by the user. Actions by the user may include, for example, clicks on search results, clicks on advertisements, refinements of queries (such as the user's submission of new queries after submission of an earlier query that are similar to the earlier query), and other actions. Examples of other actions may include explicit or implicit indications of interest, such as hovering over or in the area of a potential selection, the area(s) of the screen the user may be viewing, and other data.

In one embodiment, a log file may comprise data indicating a search query received by a search engine from a user, the internet protocol (IP) address from which the search query originates, a cookie from the user, the response to the query by the search engine (such as, for example, the search results returned to the user in response to the query in the form of a search result set), actions taken by the person submitting the search query (such as actions taken by the person in relation to the search results provided by the search engine in response to the query, including actions such as selecting a search result, and such as the submission of a new or revised query by the person), time that actions occurred, and other data. In one embodiment, the search result set comprising all of the search results determined by the search engine in response to the user's query is recorded in the log file. In other embodiments, fewer than all of the search results may be recorded.

To include in a log file the selection of a search result by a user, such as the "clicking on" of the search result by the user, various techniques may be used. For example, a link embedded in a search result may point to the search engine's site, and when a user clicks on the search result, the user's selection may first be directed to the search engine site (at which time the selection of the search result may be recorded in the log file), and then the user may be redirected to the site associated with the search result. As another example, code (such as Javascript) may be placed in the page used to present search results to the user such that notification of the user's selection of a search result is sent to the search engine at the time of selection.

As one example, in one embodiment, a search query submitted to the search engine 120 is represented by variables in a query string of a URL directed to the search engine. For instance, a query of the Google™ search engine for the terms "bmw convertible used" may result in the following URL being submitted to the search engine "http://www.google.com/search?hl=en&ie=UTF-8&oe=UTF-8&q=bmw+convertible+used." This URL may be recorded in the log file 132.

In the example illustrated in FIG. 1, a log file 132 comprising the data discussed above for multiple search queries across multiple users using a particular ranking algorithm has been developed and stored. The log file 132 may be stored in any suitable location. The log file shown in FIG. 1 is located in the data store 130. The log file 132 comprises the types of log-file data mentioned above recorded in relation to the particular search algorithm.

For illustration purpose, the system illustrated in FIG. 1 is used to describe the method shown in FIGS. 2-6. Of course, the methods shown in FIGS. 2-6, and other methods, may be carried out by other systems.

The example methods of deriving an interaction profile described make use of log files. Log files are used only as an example of the type of data that may be used, as other types of files and information may be used in accordance with the present invention.

Introduction to Interaction Profiles

An interaction profile comprises data indicating one or more interactions that have occurred with an object of the profile. One example of an interaction profile comprises a selection profile. A selection profile may comprise data indicating a histogram of one or more of various types of one or more interactions (such as clicks) for an object of the profile. A selection profile may be referred to as a click profile in an environment in which many of the interactions with the object is carried out through clicking an input device, such as a mouse, to select and/or interact.

An object comprises the item or object that constitutes the subject matter of concern, operation, or analysis. One example of an object in accordance with the present invention is a particular search result. Another example of an object is a group of search results, whether in a search result set, multiple search result sets, or otherwise. Another example of an object is a particular URL. Another example of an object is a particular domain, which may include multiple URLs. There may be other suitable objects, and these serve only as examples.

In one embodiment, a click profile comprises aggregated data reflecting behavior of one or more users over all queries on an individual search result. For example, the data may reflect user behavior relative to a search result when the search result is returned to a plurality of users when submitting a plurality of different search queries. In another embodiment, a click profile comprises aggregated data reflecting user behavior over all queries on a plurality of search results (including, for example, all search results over a time period for an algorithm). For example, the data may reflect user behavior relative to a group of search results (whether previously returned in the same search result set or not) when one or more of the search results in the group result are returned to a plurality of users when submitting a plurality of different search queries.

As one example, a click profile may comprise data indicating a histogram for a search-result set returned by an Internet search engine in response to a search query. The histogram may be, for example, a histogram of click types and/or durations. The click profile for the search result set may include one or more of a variety of metrics (or attributes or properties). Metrics are standards or properties of measurement. The metrics in a click profile may include metrics indicating a level of satisfaction with an object, such as a search result or a search result set. A level of satisfaction indicates a level or degree of satisfaction. For example, a click profile for a search-result set may comprise the total number of clicks made on the set during a user session, the total number of single, long clicks made on the set during a user session, the ratio of long clicks to short clicks on the result set during a user session, and the number of refinements of the original query made during a session. A click profile for a particular search result may comprise these same metrics. The metrics, and other metrics, may indicate the level of satisfaction that a human being has or had in relation to an object or an interaction.

Short and long clicks are relative terms. A short click indicates that the user returns to the result set shortly after clicking on one of the results (e.g., a user clicks on a URL in a result in a result set, views the page associated with the URL, and immediately clicks the "Back" button on the user's Internet browser). In one embodiment, a short click is a click that is less than 80 seconds in duration. A long click indicates that the user either returns to the result set after a relatively significant time viewing other pages (e.g., after 200 seconds or more), or does not return to the result set. A long click often indicates that the user located content of interest upon clicking on a result in the result set.

A click profile may include other information. For example, in a click profile for a search result (a result in a search result set), the click profile may include the click sequence. For example, the click profile may indicate whether an action occurred before or after another action in a session. In other embodiments, the location of the search result when clicked on (for example, the first result in the search result set, or the fifth, or the tenth), and the page on which the search result clicked on resided (first page returned, second page returned, etc.), may also be indicated in the click profile. In some search-engine systems, the user may alter the number of search results provided per page, and thus recording the search result's ranking and the page number on which it appeared may be beneficial. The click profile may also include an indication of whether the search result was the first result clicked on in the search result set, was the second result click on, or was later in a sequence of clicks. In one embodiment, a click profile may comprise arbitrary observable information about a user session that contains a result. Such information may include, for example, the number, sequence, and duration of clicks.

A click profile for an object, such as a search result, across multiple user-sessions may be useful in evaluating search algorithms and other aspects of providing search results. These multiple user-sessions may be sessions of many different people. Aggregating data for an object across multiple user sessions to construct an interaction profile, such as a click profile, for the object may provide a reliable basis for analysis. For example, a click profile for a particular search result may include data associated with all instances of a particular query for which returned results include the particular search result, data associated with all instances in which the particular search result is included in returned results for any search query, or other data. Similarly, a click profile for a particular domain may include data associated with all instances of a particular query for which returned results include the particular domain, data associated with all instances in which the particular domain is included in returned results for any search query, or other data. As still another example, a click profile for a particular search (or scoring) algorithm may include data associated with all search results for all queries processed by the algorithm over a defined time period or other data.

Accordingly, a click profile may include all, none, or some of the properties or metrics mentioned above in relation to a click profile for an object, with the quantities aggregated across the multiple user-sessions. Other properties or metrics may also be included in such a click profile. As one example, a click profile for a search-result set across multiple user-sessions may include the ratio of single to multiple clicks on the search-result set (for example, the number of times a user clicked on only one search result in the result set (single clicks) to the number of times a user clicked on more than one search result in the result set (multiple clicks)). Multiple clicks, as used herein, typically refers to the situation in which a user clicked on more than one result during a user session. Thus, in one embodiment, in any given user session, there may be no clicks, one click, or multiple clicks.

The properties or metrics within a click profile may vary according to its object, according to its intended use, or other factors. Also, the method of determining the click profile may vary depending on its object. For example, determining a click profile for a particular ranking algorithm may involve determining attributes or metrics across multiple user-sessions involving the interactions of multiple users with multiple search result-sets. It is desirable for the click profile developed to include the data needed or useful in methods carried out using the profile.

Example of Deriving an Interaction Profile

Figure 2:
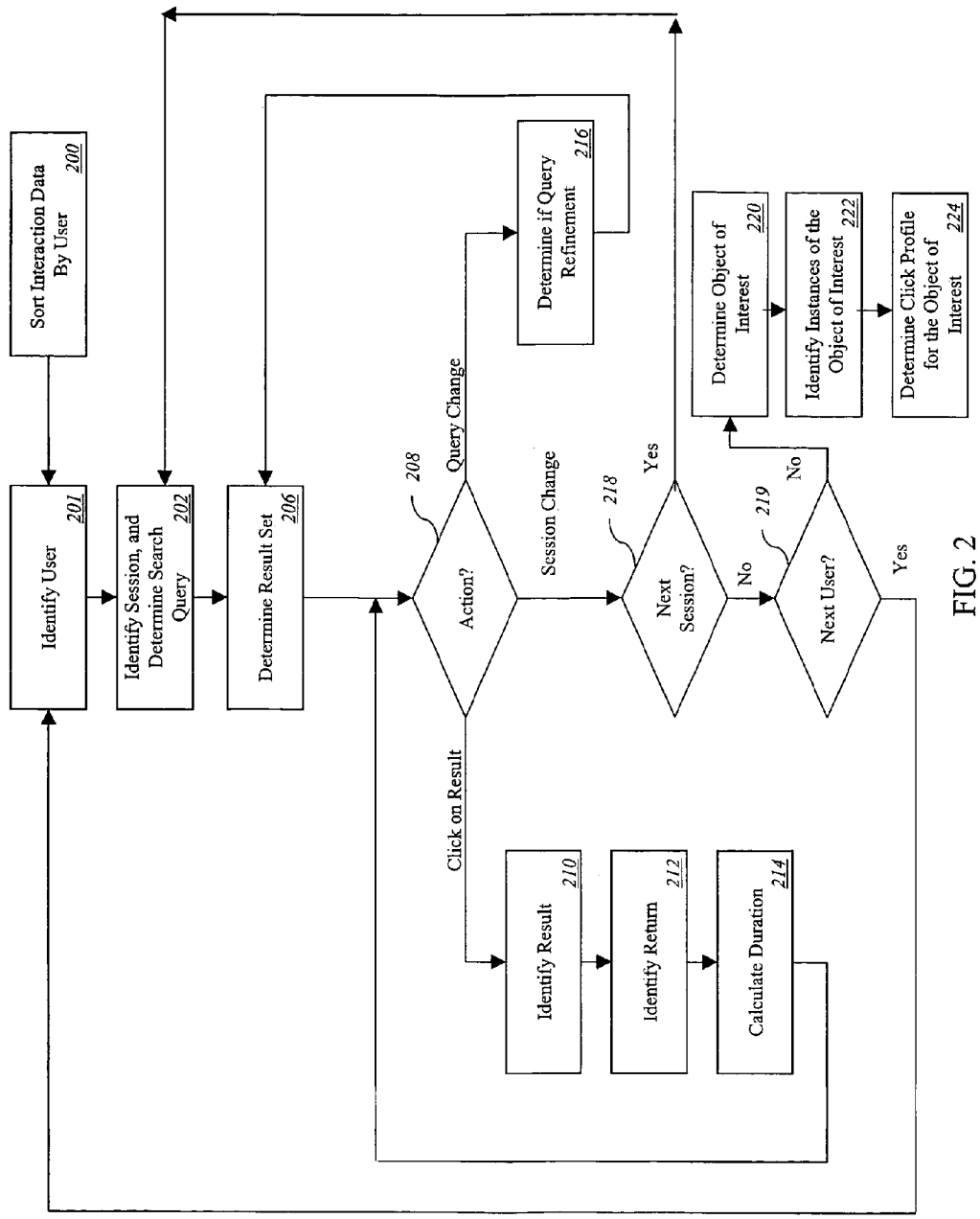
FIG. 2 is a flowchart illustrating a method for deriving a click profile in one embodiment of the present invention.

FIG. 2 is a flowchart illustrating a process for deriving an interaction profile in one embodiment of the present invention. In the example method illustrated in FIG. 2, an analyzer 122 examines the log file created by the server device 104 in response to access of the search engine 122 by one or more persons 112a-n, and determines a click profile for an object. In the embodiment shown, the object is a group of search results. The method makes use of a log file 132, previously constructed as described above.

Referring to the embodiment shown in FIG. 2, the analyzer 122 first groups the log entries in the log file 132 by user by sorting interaction data in the log entries by user 200. A particular user's interactions, as recorded in the log file over a time period, may be identified in any suitable manner. For example, a user may be identified by the user's IP address. However, many users' Internet Protocol (IP) addresses change from session to session. As another example, the search engine may provide each user with an identifying cookie or other identifying data. The presence of the cookie may then be logged in the log file 132, along with identifying information, to indicate the activity of a particular user. The analyzer 122 then sorts the interactions recorded in the log file 132 by user (as identified by IP address, cookie-based identification, or other identification), grouping the interaction data recorded in relation to the sessions for a user together, and records the sorted-by-user data in a sorted log file 136. This sorted log file 136 may be stored in the data store 130 or in another suitable location.

Once the sorted log file 136, sorted by user, has been created, the analyzer then begins its analysis of the sorted log file 136 to determine the data used to create a click profile. The analyzer 122 identifies a user for analysis 201. In the first instance, in one embodiment, the analyzer 122 reads the sorted log file 136 and identifies the first user indicated in the sorted log file 136 as the user for current analysis. As discussed below, the process will repeat for the next user listed in the sorted log file 136, and so on, in one embodiment of the present invention.

After identifying the user for current analysis 201, the analyzer 122 then identifies the beginning of a session in the sorted log file 136 for the user, and determines a search query of interest 202. Identifying the beginning of a session may comprise, for example, identifying a point in the sorted log file 136 at which a first interaction for a user is recorded. In other embodiments, a new session may be indicated by the IP address of the user (or requestor) changing, a pre-defined time passing before a next interaction occurs, or other standard. A session typically indicates data associated with a single person's interactions with the search engine 120, but can also involve multiple users.

Alter the analyzer 122 determines the beginning of a session, the analyzer 122 determines a search query submitted during the session. For example, in one embodiment, the analyzer 122 determines a search query submitted during the session by accessing the sorted log file 136, and parsing a log entry containing the search query. In the instance that the log entry comprises the URL submission mentioned above, the analyzer 122 may extract the search query from the values of the variable q in the query string ("bmw+convertible+used" in the example given).

The analyzer 122 next determines the search results provided by the search engine for the determined search query. For example, the analyzer 122 may determine article identifiers that would or did result from the search query 206 when searched by a search engine using the particular algorithm. In one embodiment, the search results returned to the user during the session have been recorded in the log file 132, and are recorded in the sorted log file 136. Thus, in such an embodiment, the analyzer 122 may determine the search results provided by examining the sorted log file 136 for that session. In another embodiment, for example one in which search results are not recorded in the log file 132, the analyzer 122 may resubmit the query to the search engine 122 (if still using the particular algorithm at issue) or another search engine using the algorithm associated with the web file in to determine the result set, access an archive of search results for queries, or otherwise determine the content and order of the result set for the search query in relation to the particular algorithm at issue.

In the embodiment shown in FIG. 2, the analyzer 122 then proceeds sequentially through the sorted log file 136 and identifies a next action 208. The next action comprises data indicating an action, typically a subsequent action, associated with the requestor's interaction with the search engine, such as the requestor's interaction with results from the search engine. Initially, the analyzer 122 determines a next action comprising the next action recorded in the sorted log file 136 that occurred after the requestor received search results in response to the requestor's search query. In the embodiment shown, the next action comprises data indicating clicking on a result, changing the query, or a session change.

The analyzer 122 may identify the next action as a selection of a result in the returned search results, such as clicking on a result 208. For instance, the analyzer 122 may compare the article identifiers in the result set to the URL indicated as selected by the user in the sorted log file 136. If the URLs match, the analyzer 122 concludes that the user clicked on the result associated with the URL. In one embodiment, the tog file 132 and the sorted log file 136 include an indication that a URL selected by the user was included in the search result set.

The analyzer 122 identifies the result selected 210. Identifying the result may comprise, for example, identifying the URL associated with the selection, determining the sequence and page number of the result within the result set, and determining any other properties of the result desired that may be used subsequently.

Based on entries in the sorted log file 136, the analyzer 122 may then determine if and when a session returns to the search engine 212. For instance, the analyzer 122 may examine the sorted log file 136 to identify that the user under analysis selected a result from a result set, and then interacted again with the search results or the search engine within 300 seconds of such selection, and the analyzer 122 may treat those actions associated with the user as having occurred during the same session. This is just one example of an identification of a return of a session to the search engine. In another embodiment, the analyzer 122 may treat an interaction that occurs within a pre-defined time period (for example, 1800 seconds) after the previous interaction recorded for the user in the sorted log file 136 as part of the same session as the previous interaction. In another embodiment, the analyzer may treat the user entering a query that is not a refinement as a new session. In still another embodiment, the analyzer may treat the user entering a query that is different from the original query of the session as a new session.

The analyzer 122 may then calculate the duration between the request for the result (e.g., the click) and the return 214. The duration reflects the time between activities visible to the search site, and is estimated by the analyzer 122 from the timestamp offsets between interactions found in the sorted log file 136. The analyzer 122 may compute the values of other metrics as well by, for example, examining the sorted log file. For example, in one embodiment, the analyzer 122 computes a delay. The delay represents the time that the user spent looking at the search page to determine which result to click.

The method shown in FIG. 2 illustrates a method in which a result, return, and duration are determined. In other embodiments, one or more of these attributes may be incalculable, not present, or otherwise not determinable. In one such embodiment (not shown), the method returns to the next action determination 208 in such an event. In another such embodiment (also not shown), the attributes that may be determined are determined, and then the method returns to the next action determination 208.

Also, in other embodiments, further or different attributes or metrics associated with the session may be determined and stored. Essentially, the analyzer 122 may determine attributes or metrics associated with the sessions that will be necessary or useful in constructing a click profile for the object of the analysis.

After calculating duration 214, the analyzer 122 determines the next action using the log file 208. If the next action is determined to be the receipt of a new query (or a query change) from the user within the session, the analyzer 122 determines whether the new query is a refinement of the existing query 216. In one embodiment, the analyzer 122 determines a new query is a query refinement if the new query and the old query share a common term. In another embodiment, the analyzer 122 determines that a new query is a refinement of an old query if the queries share a common synonym. For example, if an old query includes the term "car" and a new query includes the term "automobile," the new query is treated as a refinement of the existing query. Typically, a user refines a query when the user is not satisfied by the results returned by the first query.

After determining the submission of a new query in a session 208, and determining whether the new query is a query refinement 216, the analyzer 122 determines the result set for the new query 206 (for example, by any one of the methods described above). The analyzer 122 then determines what action is occurring 208 and proceeds accordingly.

In the embodiment shown in FIG. 2, the process is repeated for all users and sessions in the sorted log file 136. If the next action determination 208 determines that the next action in the log file is a session change, then analyzer 122 then determines if there is a next session for analysis 218. For example, the analyzer 122 may look in the sorted log file 136 to determine if there is a subsequent session for the user to the session under analysis. If there is a next session, the method shown repeats, beginning again at block 202 for the next session. If the analyzer determines that there is no next session for the user under analysis in the sorted log file 136, the analyzer determines if there is data recorded in the sorted log file 136 for a next user 219. For example, the analyzer 122 may look in the sorted log file 136 to determine if there is a subsequent session recorded in the sorted log file 136 that is for a different user. If there is data for a next user, the method shown repeats for the next user, beginning again at block 201 by identifying the next user.

When carrying out methods as shown in FIGS. 2-6, described herein, and otherwise, the analyzer 122 stores the results of the identifications, calculations, determinations, and other analysis data in memory or in a data store, such as data store 130. The data stored may comprise instances of the triple (s,q,r), where s is a collection of session-related properties, q is a collection of query-related properties, and r is a collection of result-related properties. An instance comprises an occurrence or presence.

The session collection s may comprise, for example, the IP address of the session, the time and date that the session occurred, and other session-related data. The query collection q may comprise, for example, the search terms of a query submitted during the session s, the class of the query (e.g., navigational or search, etc.), and whether the query was refined or not. The result collection r, may comprise, for example, the result set returned in response to the query, the sequence of results, click data for each of the results in the result set, including quantity, sequence, and duration of clicks, and other result-related information. The sequence of clicks refers to the number of clicks within a session. An instance of the triple (s,q,r) may be stored for each session identified in the log file. The data stored as the triple (s,q,r) should comprise the data necessary or useful in determining a click profile for the desired object of consideration. The triple (s,q,r) may provide the information to compute interaction profiles for one or more search results or groups of search results of interest.

There are a variety of ways to use such data to generate a click profile. Moreover, click profiles may be generated for any one or a group of objects, such as a search result, or a search result set. Click profiles may also be generated for other objects, such as a ranking algorithm (or scoring algorithm), a group of algorithms, a particular query, or other suitable object.

In one embodiment, the instances of (s,q,r) provide the raw data for deriving a click profile for a search result, group of search results, or other object. For example, utilizing the raw data, the analyzer 122 can provide an aggregated click profile for search results of specific queries and classes of queries, as well as an aggregated click profile for specific results or result sets. In one embodiment, this data may be further refined to constitute a click profile.

Referring again to FIG. 2, in one embodiment according to the present invention, when the analyzer 122 determines that there is no next user for analysis in the sorted log file 136, the analyzer may then determine one or more click profiles. For example, a click profile may be determined for one object, or multiple click profiles may be determined for multiple objects, selected by an operator or by computer. Referring to block 220, the analyzer 122 next determines an object of interest. As indicated by the examples above, this may be done in any suitable manner. For example, the analyzer 122 may ask an operator to indicate an object of interest by asking the operator for a query of interest, and then the analyzer 122 may designate the search result set associated with the query as the object of interest. As another example, the analyzer 122 may select some order of search result sets as objects of interest (for example, by time received by a user, alphabetical order based on query associated with the search result set, by the number of times provided, or other measure), and select the first one in the order for analysis. As still another example, the analyzer 122 may ask the operator to designate a search result of interest by asking an operator to input a URL reflecting the search result of interest to the user. In another embodiment, an operator may select a type of object for analysis because the operator wishes to conduct an analysis for each object of a certain type or kind (for example, the type or kind of object selected may be domains that appear in a large set of sessions, and thus the objects of interest will be those domains). In one such embodiment, the analyzer would generate a click profile for each of those domains automatically.

Once an object of interest has been determined 220, the analyzer 122 then identifies all instances of the object in the raw data previously generated 222. In block 220 or block 222, the analyzer 122 may identify these instances. In other embodiments, if the object of interest is a group of search results that constitutes a search result set for a query, the analyzer may identify instances of the search result set by identifying occurrences of the query (or queries) associated with the search result set. In other embodiments, fewer than all of the instances may be identified and used.

As one example, the object of interest may be a particular search result input by the operator. Once the instances of the object of interest, in this case a particular search result, has been identified 222, the analyzer 122 determines the click profile associated with the search result of interest across multiple sessions 224. This may be carried out in a variety of ways. In the embodiment shown, the click profile for the search result of interest across multiple sessions comprises interaction attributes, such as click-duration data, multiple-click data, and query-refinement data. Click-duration data comprises data relating to the duration(s) of one or more clicks. Multiple-click data comprises data relating to the instance of greater than one click in, for example, a user session. One example of multiple-click data is data indicating that there was, or was not, more than one click during a user's session with search results. Query-refinement data comprises data relating to the refinement of a search query in, for example, a user session. Examples of query-refinement data may include data indicating whether or not the user refined an original query during a user session, and data indicating the substance or text of the refinement itself. In one embodiment, the click profile comprises the total number of clicks made on the search result during a user session, the total number of single, long clicks made on the search result during a user session, the ratio of long clicks to short clicks on the search result during a user session, the number of refinements of the original query made during a session when the search result was returned in a search result set, and the ratio of single to multiple clicks on search-result sets that included the search result. To determine the click profile for the search result of interest, the analyzer 122 may determine these metrics by calculating them based on the raw interaction data described previously. Other embodiments may include other or different properties or metrics in the click profile. The value of the metrics (e.g., the length of time, text of query refinement, a yes or no indicator, or other value) May be calculated and stored in the click profile.

In one embodiment, these properties or metrics are aggregate totals. That is, if there are one thousand instances of the search result set in the data, and in each and every instance of the search result set, the user made two long clicks during a session, the metric of long clicks made on the set during a user session in the click profile for the search result set would be two thousand. In other embodiments, the data associated with each search result set is used to determine an average for each metric desired. Thus, in the previous example, the metric of long clicks made on the set during a user session in the click profile for the search result set would be two (i.e., the average across all instances). Any aggregate statistic or combination of aggregate statistics may be used, including the mean, median and mode, as well as variance, skew and higher moments, histograms and more-complex parametric and non-parametric data models. As mentioned, a click is just one type of selection, and interaction profiles may comprise nonclick data. For example, the interaction profile of a result can comprise information about when it was presented but not clicked on, such as the fraction of time it was presented and not clicked on, the fraction of time it was presented in a session where one result was clicked on, but it was not the result in question.

Further refinement may be carried out in generating a click profile. For example, a combination of properties or metrics for a search result set in a session may be weighted to determine its contribution to a property or metric for the overall analysis of the search result set.

Thus, the analyzer 122, in calculating the values of properties or metrics to be used in the click profile for a search result set across multiple user-sessions may take into account general metrics associated with user behavior in deriving a click profile. It may choose to weigh various properties or metrics accordingly. For example, it has been observed that typically, clicks on search results decrease sharply with position. About 55% of all clicks occur on the first 5 results, and about 75% of all clicks occur on the first page. Also, out of all clicks, the maximum fraction, 22%, goes to first position clicks. The drop-off function can be modeled either by a linear approximation or a power law. Further, the fraction of single clicks decreases as the position increases (i.e., as the result appears further down in the result set).

Also, it has been observed that navigational queries have a very low refinement rate (<about 0.3%) and a high instance of single clicks (about 81%). Further, long queries and queries with syntax have several percentage point differences in overall click through and in the proportion of single/multiple clicks observed. Of clicked sessions, short queries average about 58% single clicks, while long queries average about 52% single clicks. These and other observations may be used in calculations and determinations according to the present invention. Such data may be used, for example, in a stratification method or other method. For example, metrics may be aggregated separately for different cases, such as navigational and non-navigational, and then compared for each class independently. Referring again to FIG. 2, the determination of an object of interest 220, identification of instances 222, and determination of a click profile for the object of interest across multiple user sessions and multiple users 224 may be repeated for all or less than all of the objects of interest identified as present in the analysis (not shown). For example, if there are multiple search results in the object of interest, such as in a particular search result set, a click profile for each of the search results across multiple user sessions and multiple users may be determined in this manner.

In another embodiment, the raw data, or instances of (s,q,r) itself, may serve as the click profile. That is, in certain embodiments, the body of instances of (s,q,r) data, or a subset thereof, may serve as a click profile.

Interaction profiles, such as click profiles, may be used in a variety of ways. Some examples are provided below.

Evaluation of a Particular Class of Search Result

Click profiles may be utilized to evaluate the likely quality of an object, such as a search result. The quality of a particular search result as indicated by its click profile may be compared with the quality of other search results in a group of results of interest (such as a group of results in a result set) to detect differences in user behavior. This detection may be used to detect an article with an undesired attribute, to detect a manipulated article (such as spam), to detect a high-quality search result that should appear higher in search rankings, to evaluate the quality and usefulness of a search algorithm, and for other purposes. A manipulated article comprises an article that has been manipulated. For example, a manipulated article may comprise an article that has been manipulated specifically to influence a search engine's treatment of the article.

In one embodiment of such a utilization, a click profile may comprise information useful to identify a particular search result as likely "good" or "bad," or to identify the domain associated with the result as likely "good" or "bad." At an individual-interaction level, a user-behavior profile for a search result is affected by both position in its search result set and presentation bias—attributes of the result that attract the user to click on the result but are not necessarily linked to result quality (e.g., mimicking the user's query in the result). Analysis of the probability that a search result is "good" or "bad" search result using data for multiple users across multiple user-sessions may attenuate this affect on search-result quality analysis.

The quality of an object, such as a search result, may comprise a characteristic or property of the object that indicates its degree or grade of satisfaction of a desire, interest, or search. For example, a high-quality search result may indicate a search result that is associated with content of interest that is perceived as satisfactory by a person. A low-quality search result may indicate a search result that is associated with content that is perceived as unsatisfactory by a person.

The terms "good" and "bad" relative to search result provide an approximate quality of the search result, as perceived. For example, a "good" search result may be a search result that is of high quality; that is, it is associated with content of interest that is perceived as satisfactory by a person. Likewise, a "bad" search result may be a search result that is of lower quality—that is, a search result that is associated with content that is perceived as unsatisfactory by a person. As the level of satisfaction of a human being is inherently a subjective variable, analysis of the relative "goodness" of a search result is inherently an approximation of likely human perception.

A degree of quality, or a degree of "goodness," or a degree of "badness," may be determined. Such a degree may indicate the relative level or magnitude of the trait.

Moreover, thresholds in relation to such degrees may be designated. For example, a function may determine that a particular search result should be assigned a value of 0.55 as a degree of "goodness," and that another search result should be assigned a value of 0.45 as a degree of "goodness." A method used may be to designate all search results with a value of 0.5 or higher as "good" results, and all search results with a value of 0.49 or lower as "bad" results. The setting of these thresholds may be done by observation, experiment, or other ways. Further, the definition of "good" and "bad" may be defined numerically in a particular utilization.

Figure 3:
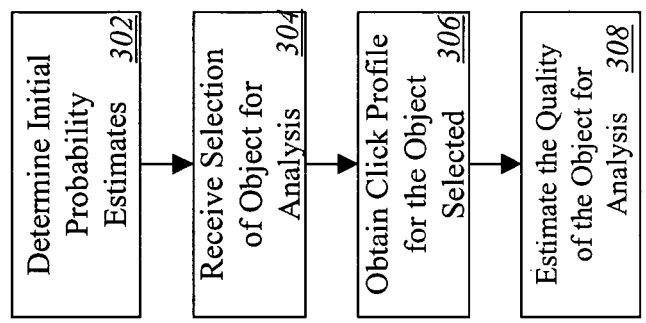
FIG. 3 is a flowchart illustrating a method for estimating the quality of an object in one embodiment of the present invention.

FIG. 3 shows an example method for estimating the quality of an object according to the present invention. In one method according to the present invention, prior to undertaking a quality-analysis of a particular object, initial probability estimates for various user actions are learned 302. In one embodiment, these estimates are learned by comparing human-labeled result qualities to logged click behavior over a large set of (query, document) pairs obtained or derived from click profiles. This comparison allows for the determination of the metric values that indicate desirability. In one such embodiment, a human evaluator assigns a quality rating to a search result by examining the search result, and the content to which it may be linked, as returned for the used search query. The quality rating may comprise a number between 0 and 10.

For example, these human evaluators may evaluate a designated group of search results. In one embodiment, the group of search results is a relatively large group of search results.

Click profiles for this large group of search results are generated using methods like that described in relation to FIG. 2. These profiles indicate the actions taken by multiple users across multiple session sets.

The human-labeled result qualities for this large group of search results are then compared with the logged click behavior over a large set of (query, document) pairs for the large group of search results. Accordingly, through observation, the likelihood that a particular action, or a sequence of actions, results in a user clicking on a result that includes good content or that the user will perceive as good can be learned.

In one embodiment, based on such a comparison, the likelihood of an action taken resulting in the user finding satisfactory, or good, content by taking the action is determined to be as follows, p(good| observation):

TABLE 1

| Sequence | Not Clicked | Duration | | | |
| --- | --- | --- | --- | --- | --- |
| | | Short | Medium | Long | Last |
| None | 0.2 | X | X | X | X |
| Single | 0.2 | 0.621 | 0.758 | 0.9 | 0.738 |
| Multiple (not last) | 0.2 | 0.2 | 0.646 | 0.545 | X |
| Multiple (last) | 0.2 | 0.299 | 0.507 | 0.510 | 0.557 |

Table 1 above is an example of computing P(good |{click type, sequence). There are a variety of refinements that may be made in relation to such functions, and this table provides just one example.

In the table above, the rows indicate clicks sequence type. The first sequence type, or first row, is a session in which no results were clicked. The second sequence type is a single click in a session (e.g., just one selection made in the session). The third and fourth types (third and fourth rows) are species of multiple clicks. A click that is a multiple click is one that is one of two or more clicks in a session. If that multiple click is the last click made in a sequence of clicks in a session, it is categorized as a Multiple (Last) type. If that multiple click is not the last click made in a session, it is categorized as a Multiple (Not Last) type.

The columns indicate the duration of the click observed. The first column indicates an instance in which no click was observed. The second column indicates a click of short duration. For the data in the table shown above, a click of short duration is one that is less than 80 seconds, a click of medium duration is one that is greater than 80 seconds and less than 200 seconds, and a click of long duration is one that is more than 200 seconds. These duration-time designations were learned through observation by the techniques described herein. The fifth column ("last") indicates a click from which the user did not return, and thus for which no duration is available. For example, a click of "last" duration may indicate a click that is made by a user, and then the user does not return to the search result set.

In Table 1 above, cells marked "X" are logically empty. For example, in a session with no clicks (first row of the table), all results must be of type "Not Clicked."

A probability function to determine the quality of a particular object, such as the probability that a particular search result is a good result, may vary according to preference, data set behavior, and other factors. In selecting the probability function, various factors should be considered. For example, although clicks may indicate a user's satisfaction with results only fifty percent of the time, certain types of clicks represent a user's satisfaction eighty percent of the time. Long clicks (such as those with duration over two-hundred seconds) tend to indicate user satisfaction (e.g., relevant content found). Also, clicks that are the only click of a user on a set of search results indicate user satisfaction with that result. In other embodiments, combinations of these metrics may be used to identify "good" results. One principle indicator is the ratio of short to long clicks received by a result domain. A relatively low ratio indicates a low quality or bad result set. Also, clicks of less than eighty seconds duration, or that are one of many clicks in a sequence, frequently indicate low quality results. However, clicks with short duration or that are part of a multi-click sequence may also be indicative of browsing. Thus, individual clicks are not reliable indicators for quality. Further, the fact that results are not clicked on may serve as a type of click, i.e., it provides additional information for rating a set of results. These and other factors may be considered in selecting a probability function.

For example, in one embodiment, the probability P that a search result is "good" may be based on the following function:

P(good |{click,noclick}, position, duration, sequence, refinement_next)

where {click,noclick} comprises the variable of whether a search result was clicked or not, position comprises the variable of the position of the search result in a search result set, duration comprises the variable of duration for the search result, sequence comprises the variable of sequence of the selection of the search result, and refinement_next comprises the variable of whether the original search query was refined after selecting the search result.

In another embodiment, the following function may be used to observe probability that the search result is a "good," or desirable, search result: P(good|page {click,noclick}, position, duration, sequence, refinement of query, display position, presentation statistics), where the variables are as mentioned above, with the addition of the display position variable, which comprises the position of the search result within a provided search result set (e.g., first, second, tenth, etc.), and the presentation statistics variable comprises data regarding the presentation of search results, such as the frequency of presentation of the search result in a search result set. Such functions and approaches, and other functions and approaches, may be refinements on the function and approach mentioned above with reference to Table 1.

Referring again to FIG. 3, an object, such as a particular search result, may be selected for analysis, and the analyzer 122 may receive this selection 304. This selection may be made in any suitable manner. For example, a human operator may select a particular search result for analysis by selecting the search result from a list of search results provided in a graphical user interface. A click profile for the object, such as the search result selected, may then be obtained 306. For example, the click profile may be constructed in a manner like that described in relation to FIG. 2. Alternatively, the click profile for the object may have been previously constructed, and the analyzer 122 may locate the click profile for the object in a database. A click profile useful in such analysis may contain the data needed to determine the probability that the particular result is good or bad, based on the factors in use in the particular method to make such a determination.

After determining the click profile for a search result under analysis, the analyzer 122 may estimate the quality of the search result 308. For example, the analyzer 122 may calculate an estimation of the quality of the search result. In one embodiment, if sufficient data is available to generate various metrics for a click profile, the quality of the profile may be analyzed. In another embodiment in which data may be limited or that is focused on a particular session, the probability that a particular result is good based on prior user interactions may be calculated. In other embodiments, these or other suitable approaches may be used.

In one embodiment, a calculation of the quality of a search result involves estimating a probability that the search result is a "good" result is based on a variety of observable measures. In one such embodiment, the click profile for the search result provides the analyzer 122 with the user-action data that may be used to determine the number of short clicks, the number of medium clicks, and other metrics that may be indicative of the quality of the search result. The probability that the search result is a good result is a product of this user-action data and the probabilities set out above as applied to user-action data. Expected goodness of search result given observables may be calculated as a mean value. For example, it may be calculated as the sum over all relevant observations: $1/n*sum\_n[p(good|observation(n))]$.

In one embodiment, the analyzer 122 compares a click profile metric, such as the fraction of long clicks, for a particular object of interest (such as a search result) with the same metric for other comparable objects. If the analyzer 122 determines that the metric for the particular search result of interest is in the bottom $5^{th}$ percentile (or, in another embodiment, in the bottom $10^{th}$ percentile) of the metric for such comparable search results, then the analyzer designates the search result of interest as a poor (or "bad" or "not good") result.

The quality probability of a search result or other object may be used in any of a variety of suitable ways. For example, if the aggregated probability that the search results returned by one algorithm are good is higher than the aggregated probability that the search results returned by a second algorithm are good, then an operator may further analyze the reasons that the first algorithm returns a search result set with a higher probability. As another example, measurements from the click profiles, from probability determinations, and other determinations may be used as a signal in a scoring algorithm for a search engine. For example, the analyzer 122 may assign a number to a search result (such as a URL) between 0 and 1 that represents the probability that the result is a "good" result. The number may then be used as a signal in a ranking algorithm to score the search result for ranking purposes. For example, this probability variable may be multiplied by a score for the search result (URL) as calculated by a scoring algorithm so as to affect the ordering of a result set. As still a further example, such probabilities may be used to detect manipulated articles, and this use is discussed further below.

It should be noted that a probability measure may be made in any of a variety of suitable ways. For example, the metrics involved in the calculation may be compared to expected values, and if the metric exceeds the expected value, the metric tends to indicate a higher probably that the search result is a "good," or desirable, search result. In other words, the user performs a query and is expected to act in a certain way (i.e., the analyzer 122 expects certain values for the click profile metrics); if the user does not act in that way, it suggests that the results are not "good."

In one embodiment, the starting estimate of whether a result is "good" can be computed with a conditional probability table generated by binning and/or smoothing the features in the click profile. These features may include, for example, the click durations and sequence. Other embodiments may include the use of parametric or non-parametric models, such as logistic regression, to estimate probability of a result being good as a function of the click profile. These embodiments may include, for example, models that explicitly model sequence information, such as hidden Markov models.

In one embodiment of the present invention, an automatic learning system monitors features of one or more click profiles of one or more classes of results. The system learns a model of features of the results and their queries that predicts the quality of the results indicated by the profiles. An example of methods and systems of the type that may be used for such analysis may be found in U.S. patent application Ser. No. 10/706,991, "Ranking Documents Based on Large Data Sets," filed Nov. 13, 2003, owned by the same assignee as the present application, which is hereby incorporated by reference in full. This referenced patent application describes the learning of a model of features of results and queries that predicts whether or not there will be a long click on a result. Embodiments of the present invention may learn, for example, a model of features of results and queries that predicts the "goodness" of results, in any of the forms mentioned above.

Moreover, the fraction of good clicks associated with an interest set (such as a group of three search results) may be useful in analysis of the interest set or in comparing the interest set with another object. For example, the analyzer 122 may construct a click profile for the interest set according to the method described in relation to FIG. 2 or another method. The analyzer 122 may then access the click profile to determine the number of clicks that may be classified as "good" using the probability determinations described above or other methods. The analyzer 122 may also determine the total number of clicks (good and bad) for the interest set. The analyzer 122 may then calculate the fraction of clicks that are classified as good by, for example, dividing the number of good clicks determined by the total number of clicks. This fraction of good clicks may be used as a basis for comparison with other objects of interest, or may be used as a metric to evaluate the quality of the interest set.

Manipulated Article Identification

In one embodiment of the present invention, a click profile is developed for manipulated-article results, such as spam results. A manipulated article is an article (such as a web page) that has been manipulated to deceive or distract an analysis of the article, such as an automated analysis of the article by a web crawler or a search engine. Spam pages are one example. A click profile can be used to identify spam. In the context of search, spam comprises a result page in which standard content signals for the page, such as content and anchors, have been modified in a way that does not reflect the value of the page for the user, but causes it to be ranked more highly for queries. Spammers not only optimize web pages to achieve higher rankings from a search engine, but optimize the title and snippet to mimic results for "good" content in order to maximize the click through rate from users.

Click profiles may be used to identify spam pages and content. In one embodiment, the analyzer 122 generates a click profile for a result in a result set (e.g., a URL at the domain level), and compares the click profile for the result to a profile identified as indicative of spam. The spam-indicative profile may be identified or constructed by human evaluators or automatically, based on a variety of factors that will change depending on, among other things, varying approach by web-page spammers. It has been found that spam sites or pages have the following attributes: spam results comprise results that are overly optimized for search engines; the pages tend to score high in page-scoring algorithms, but they are seldom visited by navigational client users; they are linked to by guestbook spammers, and they can be readily identified by human evaluators.

Moreover, the analyzer 122 may derive a click profile for a class of spam results. A click profile for a class of spam results may be determined using a variety of factors. It has been observed that, for spam results, long duration clicks are only half as likely for non-spam; and results with very short clicks are the most likely to be spam results. The duration for spam results is typically short, evidencing a mean staytime of 51.3 seconds. Also, the ratio of short to long clicks is twice as high as for non-spam results, and spam results evidence more multiple clicks that other results. Generally, examining a particular result is not as effective as examining results for a domain. These and other factors may be considered in determining a click profile for a class of spam.

In one embodiment, a method for identifying a manipulated article, such as a "spam" page, that may be carried out by the analyzer 122 comprises calculating a "good click" as a long, single click, an indefinite duration single click, or a long, multiple click, and calculating a "bad click" as a short click. A "bad ratio" may then be calculated as bad clicks divided by good clicks, and a "good fraction" may be calculated as good clicks divided by all clicks for the analysis set. The bad ratio may then be calculated for the specific search result under analysis, and for the aggregate of all other search results that appear in a search result set with the specific search result under analysis. The analyzer 122 may conclude that the specific search result under analysis constitutes a spam-type result if its good fraction is less than 0.15, and its bad ratio is twice as great as the bad ratio of the aggregate of all other search results that occur with it in search result sets.

In one embodiment of the present invention used to detect manipulated articles employs the fraction of "good clicks" (for example, clicks that have more than 60% probability of being perceived as good by the user based on prior observation) and the relative ratio of good clicks to detect a manipulated article. In one embodiment, the relative ratio of good clicks comprises (good clicks on a search result under analysis/bad clicks on the search result under analysis)/(good clicks on all search results in search result sets returned to users that included the search result under analysis/bad clicks on all search results in search result sets returned to users that included the search result under analysis). In one embodiment, if the relative ratio of good clicks for a particular search result, when determined in this manner, is less than 0.5, the search result may be identified as a search result that may point to a manipulated article, such as a spam page, a page devoid of content, or unpopular content. Similarly, such a ratio may be used to identify search results that are likely good, or high-content, sites. For example, if the relative ratio of good clicks for a search result is relatively high, the search result is identified as one that is likely associated with content that is good or helpful. Other methods may be used in determining a manipulated article, and this method serves only as an example.

The profile defined for a manipulated article may be defined in absolute terms or relative to competing results. For example, in absolute terms, if a particular search result has a probability of being a good result that is lower than a predetermined probability (e.g., 50%), the search result may be designated as a "bad" result. In relative terms, the probability determination for a particular search result may be compared with other search results in a search result set or other group of search results. If that search result's goodness-probability determination is low in absolute terms (e.g., less than 50%) but is substantially higher than goodness-probability determinations for other search results in the group, the particular search result may not be designated as a "bad" result.

Figure 4:
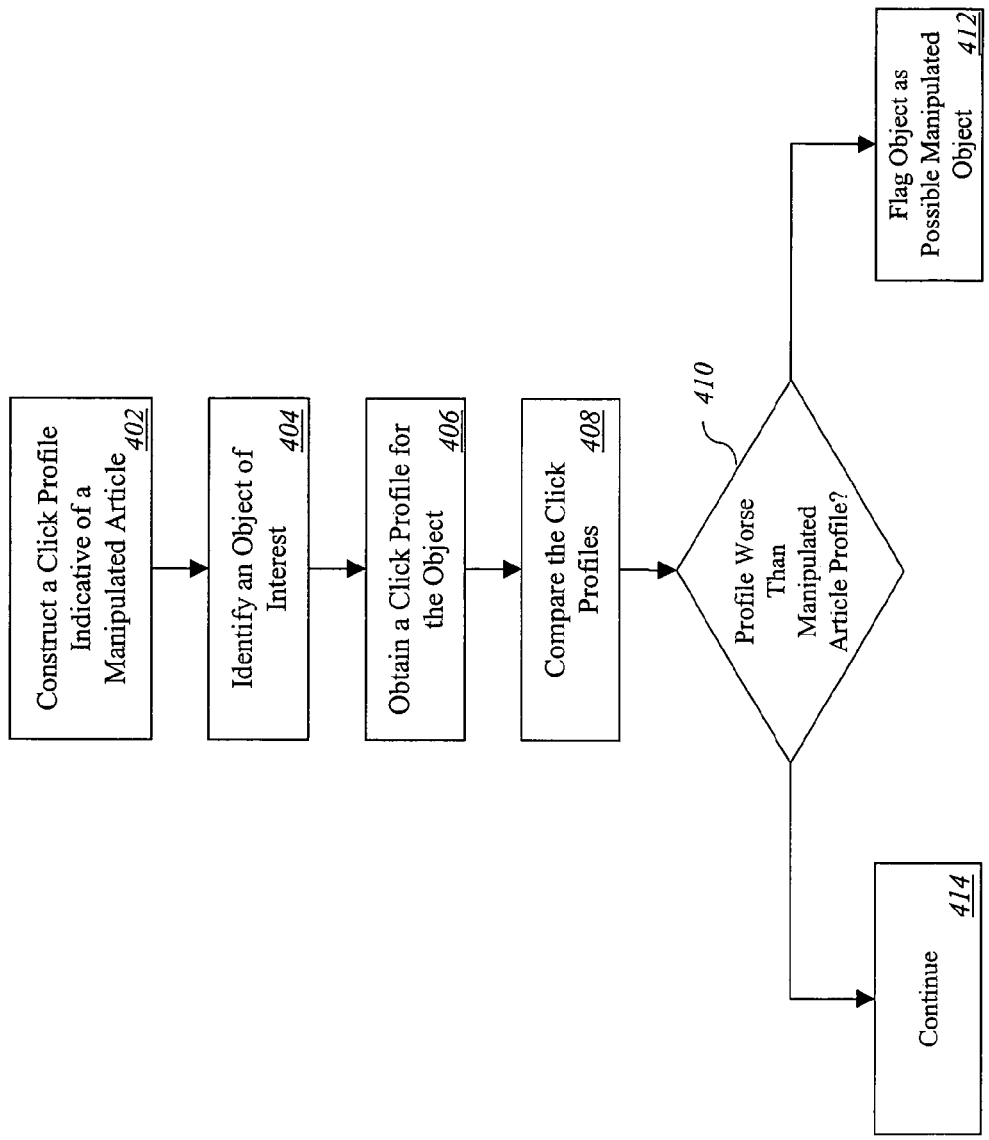
FIG. 4 is a flowchart illustrating a method for identifying a possible manipulated article in one embodiment of the present invention.

FIG. 4 shows one example of a method for identifying a possible manipulated article. In the method shown in FIG. 4, a click profile indicative of a manipulated article is constructed 402 using the techniques described above. For example, a click profile indicative of a domain that comprises a spam-type domain may be constructed according to the above. Once the spam-indicative profile has been generated, the analyzer 122 uses the profile to analyze results and result sets to identify spam. The analyzer 122 may then identify an object of interest for analysis 404. For example, a human operator may indicate a particular group of domains for analysis, and the analyzer 122 may identify a first domain in the group as the first object of interest. The analyzer 122 may then create a click profile for the particular domain under analysis 406. The analyzer 122 may then compare the metrics in the click profile for the domain of interest to the click profile for spam results 408. If the comparison reveals similarities between the profiles or other indications that the domain may be a spam-type domain, then the analyzer 122 may indicate that the domain may be a spam-type domain. For example, if the metrics for the domain of interest are worse than the manipulated article profile 410 (e.g., the duration of clicks is shorter or the ratio of short to long clicks is higher), the analyzer 122 can mark or flag the domain as probably comprising spam 412. Once the domain is marked, the search results can be de-weighted in future queries or the site can be marked for further analysis by, for example, human evaluators. If the comparison reveals that the click profile for the domain of interest is not similar to the profile for a manipulated article, or is "better than" such a profile, the method may continue by analyzing another object of interest or otherwise proceeding 414.

Figure 5:
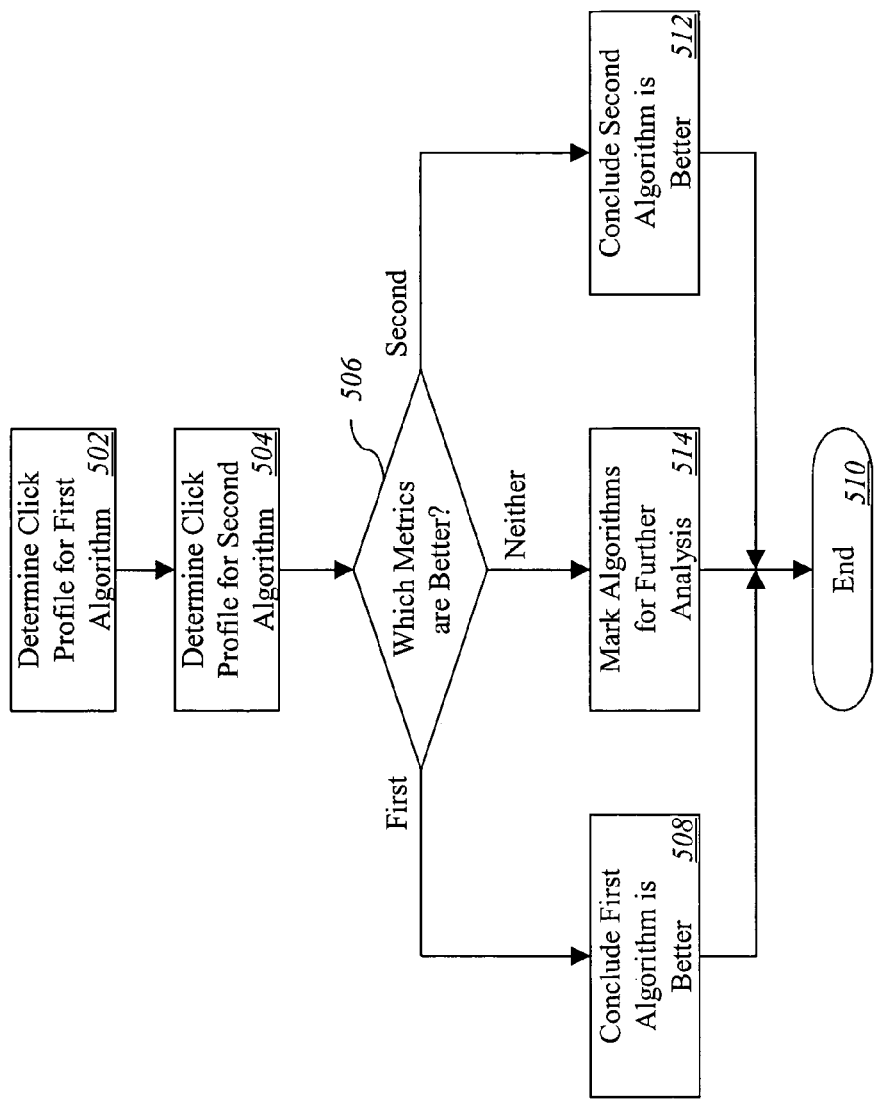
FIG. 5 is a flowchart illustrating a method for comparing scoring algorithms in one embodiment of the present invention.

Determining Ranking Algorithm Quality by Comparing Interaction Profiles of Ranking Algorithms In one embodiment of the present invention, the metrics stored in click profiles are used to compare a scoring algorithm under consideration with another scoring algorithm. FIG. 5 is a flowchart illustrating a method for comparing scoring algorithms using click profiles in one embodiment of the present invention. For a relatively constant click profile, the metrics stored in a click profile can be compared for different result sets to determine, for example, which algorithm is superior, e.g., which algorithm produces higher quality results, such as results that appear to bring a user a higher level of satisfaction.

In the method shown in FIG. 5, the analyzer 122 determines a click profile for the first scoring algorithm 502. The analyzer 122 next determines a click profile for a second algorithm 504. These determinations may be carried out in any suitable manner, such as those described herein. In one embodiment, the raw data used by the analyzer 122 to determine the click profiles is generated by causing a search engine to alternate between the two scoring algorithms over a period of time necessary to generate a data set sufficient for analysis. The data associated with the first algorithm may be stored in a first log file 132, and the data associated with the second algorithm may be stored in a second log file 134. In other embodiments, data associated with multiple algorithms may be interleaved in a single log file, and identified with a code or other data.

The analyzer 122 then compares the metrics of the two profiles 506. Metrics of a profile are described above. For example, the analyzer 122 may compare the total number of clicks for each algorithm, the number of single long clicks, the ratio of long to short clicks, and the ratio of single to multiple clicks and the number of refinements to the query. One or more of these or other metrics may be used at once.

If the metrics for the first algorithm are better, the analyzer 122 may conclude that the first algorithm is better 508, and the process ends 510. If the analyzer 122 determines that the metrics are better for the second algorithm, the analyzer 122 may conclude that the second algorithm is better 512. And if the metrics are substantially equal, the analyzer 122 may mark the algorithms for further evaluation 514. This further evaluation may be by human observer or by machine analysis.

The determination of whether one algorithm is better than another may be based on any of a variety of suitable approaches, and may vary depending on the application and desired approach. For example, in one embodiment, a higher magnitude for the following metrics may indicate a better algorithm: click rate, ratio of long to short clicks, and ratio of single to multiple clicks. In one embodiment, if all three of these metrics are higher for one algorithm, the analyzer 122 may treat that algorithm as better than the lower-scoring algorithm, and if all three are not higher for one algorithm, the algorithms are designated for further review. In one embodiment, further review comprises a human being examining the metrics, understanding the differences between the algorithms, and determining how to proceed. Another embodiment involves further computer-based analysis. For example, in one embodiment, search results from the two algorithms may be interleaved for presentation to users, such that interaction with the interleaved search results may be analyzed.

Comparing Algorithms on Different Classes of Queries

In one embodiment, a click profile may be employed to systematically improve a ranking function by evaluating search results for groups of queries. Search results for different classes of queries will generally exhibit different click profiles. For example, search results for a navigational query (such as a query for the location of a restaurant) will typically exhibit a click profile comprising a single long click or a click with no duration (i.e., the user does not return to the search results). In contrast, general-searching types of queries will typically result in multiple clicks of varying durations. In order to ameliorate the effect on overall analysis of a ranking algorithm of different behavior for different query types, or to evaluate groups of queries with common characteristics, classes of queries with certain base click profiles can be derived based on various criteria. A "class" of result pages may be defined as a set of results that appear, for example, for an individual query (such as "BMW"), a category query (such as "automobiles"), all commercial queries, or other groupings. By training automatic-learning algorithms based on click models, the algorithms can inject result sets with click-identified "good" pages by comparing the overall profile of a subclass of pages (pages with content X, or pages from mydomainx.com) to that of the larger class to identify "good" or "bad" result subclasses.

Figure 6:
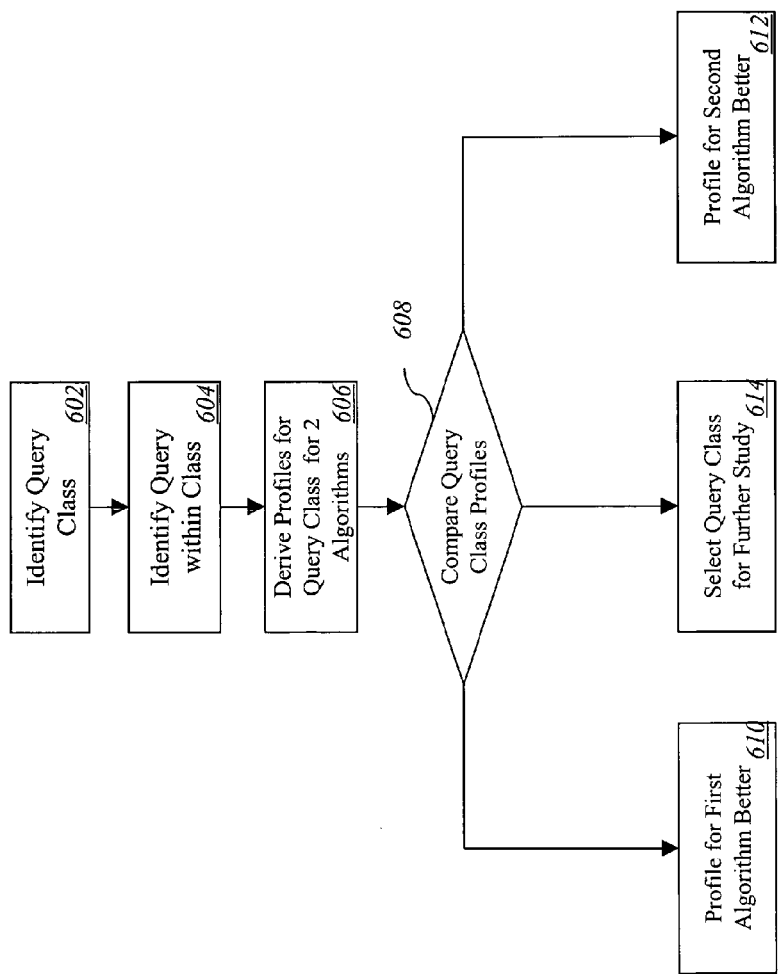
FIG. 6 is a flowchart illustrating a method for determining the relative quality of search results for a particular query in one embodiment of the present invention.

Ranking functions may be improved by studying results for a particular class of query. FIG. 6 is a flowchart illustrating a process for determining the relative quality of search results for a particular query class produced by two different search algorithms by comparing a click profile for search results returned for the class of queries by one search algorithm with a click profile for search results returned for the class of queries by a second search algorithm.

In the embodiment shown in FIG. 6, the analyzer 122 identifies a query class 602. The class may be provided explicitly. For example, a user may identify a class of queries and provide it to the analyzer 122 by inputting one or more queries that constitute the class (e.g., "directions," "map," "address," and "location."). The queries in the class may be identified automatically, or provided implicitly. Another example of classification of queries is classification of queries that result in high click duration in one group, and the classification of queries that result in medium or low click duration in another. The manual designation of queries in the class is used to describe the method for ease of illustration.

The analyzer 122 next identifies a query within the class 604. For example, the analyzer 122 may select the first query in a list provided by the user (e.g., "directions"). The query within the class identified may be one identified by a user as well.

The analyzer 122 then derives a click profile for the query class identified for the two algorithms under consideration 606. In one embodiment, the analyzer 122 does so by first deriving a click profile for the query identified. For example, the analyzer may determine a first click profile for the search results returned by the first algorithm in relation to the query "directions" (the first query identified in this example). This may be done according to the method discussed in relation to FIG. 2 by, for example, determining a click profile for the result set returned by the first algorithm in relation to the query. The analyzer then determines a second click profile, one in relation to the second search algorithm under analysis, for the query in the class identified.

The analyzer 122 may repeat the identification of a query within the class and the derivation of two profiles for that query in relation to the two algorithms under analysis in order to derive sufficient data to determine a profile applicable to the search results for the class of queries. For example, the analyzer 122 may determine two click profiles for each query in the list provided (for each query, one for the first algorithm, and one for the second algorithm).

Using the click profiles for each of the queries, the analyzer 122 determines a click profile for the class of queries under consideration for each algorithm 606. This may be done, for example, by taking the weighted average of values for the various metrics selected. They may be weighted by, for example, the number of occurrences of search results for the query.

Once the analyzer 122 has derived a class profile for each algorithm, the analyzer 122 compares the class profiles 608. The analyzer 122 compares the two click profiles for the query class. If the click profile for the query class as determined from data associated with the second algorithm displays better metrics for the query class than the first algorithm, the analyzer determines that the second algorithm produces better results for the class of queries under analysis, and may so indicate 612. If the click profile for the query class as determined from data associated with the first algorithm displays better metrics for the query class than the second algorithm, the analyzer determines that the first algorithm produces better results for the class of queries under analysis 610, and may so indicate. If the metrics for the two profiles do not clearly indicate that one algorithm is better than the other for the class of queries, the query class may be selected for further study 614. These determinations may be indicated to a user of the method, or another person. For example, a computer display may indicate the results.

Deriving a click profile for a class of queries allows optimizing retrieval algorithms to maximize the probability that "good" pages are returned. Click behavior within a class tends to be similar while click behavior between classes can be highly disparate, e.g., navigation to specific sites versus browsing for a person's name.

Click behavior may also be affected by geographical or cultural differences. Thus, in one embodiment, classes are created to reflect these differences. For example, it may be the case that users in one country tend to read faster than users in another countries. Accordingly, what would be a short click for users in the second country may actually be a long click in the first country. The profile, or comparisons of the profile, may be adjusted accordingly.

Concluding Overview

As can be seen by the above examples, there are a variety of methods and systems that may embody the present invention. The invention is not limited to these or any examples given herein.

As another, more-general example, one method according to the present invention comprises determining a plurality of metrics (also called properties) indicating a level of satisfaction for search results, determining the values of the metrics for a plurality of instances of a first object (such as a search result), and determining an interaction profile for the first object based at least in part on the values of the metrics for a plurality of instances of the first object.

Such an object may comprise any one or more of the objects discussed herein and others, including a search result, a search result set, and a scoring algorithm. For example, a useful object for analysis in examining ranking algorithm is a search result set or group of search result sets.

The metrics indicating a level of satisfaction may comprise factors that have been determined to indicate the presence or magnitude of a person's satisfaction, or happiness. For example, metrics indicating a level of satisfaction with a search result set returned by a search engine may comprise the metrics and properties discussed herein and others, and may comprise data such as the total number of clicks made for the first object, total number of single, long clicks made on the first object, the ratio of long clicks to shorts clicks made on the first object, the number of query refinements made in relation to the first object, and the ratio of single to multiple clicks on the first object. In one embodiment, the metrics determined may comprise interaction attributes. Interaction attributes comprise one or more attributes of an interaction, rather than only the number of interactions (the number of interactions can be included, but more is needed). Examples of interaction attributes comprise click-duration data, multiple-click data, and query-refinement data. In one embodiment, for example, interaction attributes comprise more than the number of clicks in a user session, or across multiple sessions, but instead comprise data about those clicks, such as their duration, sequence, whether they are multiple clicks or single clicks, whether a query was refined, and other attributes of the interactions. Determining the metrics to include within the interaction profile may comprise selecting metrics, such as those interaction attributes indicated, that may be relevant to user-perceived probability that the search results provide relevant information. User-perceived probability comprises a probability perceived by a user, such as a person.

As discussed, gathering data over multiple user sessions (for multiple users) of a search engine may provide highly useful data in analyzing the search engine, its search algorithm, and other attributes. In one embodiment, determining an interaction profile for the first object may comprise determining the values of the metrics for instances of the first object in multiple user-sessions of a search engine. One way this may be accomplished is by accessing a log file for the search engine. In the environment of interacting with web pages via a mouse or other input device, a user often provides the interactions with the search engine or other application by what has become known as clicking the mouse. Accordingly, interaction profiles in such environments may be referred to as click profiles.

As indicated in describing the example embodiments above, analysis of interaction profiles may involve comparing the profile for the first object with another set of data, such as an interaction profile for another object. In one embodiment, after determining the interaction profile for the first object, a method according to the present invention determines the values of the metrics for a plurality of instances of a second object, determines an interaction profile for the second object based at least in part on the values of the metrics for a plurality of instances of the second object, and compares the interaction profile for the first object with the interaction profile of the second object. The comparison of the interaction profile for the first object with the interaction profile of the second object may comprise determining that a particular quality of the interaction profile for the first object is better than the particular quality of the interaction profile for the second object, and further comprise indicating a positive indicator for the first object. A positive indicator is an indication of a positive nature, such as an indication of acceptable quality, a higher quality, or other generally positive attribute. This positive indicator may be indicated by displaying an indication on a computer screen, displaying metric values side by side on a screen such that an operator can view which value may be higher or lower, or by any other suitable way. Comparing the interaction profile for the first object with the interaction profile of the second object may, alternatively or additionally, comprise determining that a particular quality of the interaction profile for the first object is less than the particular quality of the interaction profile for the second object. This particular quality comparison may be made by comparing values of metrics (e.g., comparing magnitudes of duration) or by any suitable comparison. A method of providing the first object (such as a search algorithm) may be adjusted based at least in part on the comparison. For instance, the search algorithm may be altered in light of the comparison.

As discussed in relation to the examples given, methods according to the present embodiment may detect undesirable objects, such as a manipulated article (e.g., spam web-page) or other undesirable factors. In one embodiment, a method according to the present invention determines an interaction profile indicative of an undesired quality (such as a spam page, or a pornographic page), compares the interaction profile for a first object with the interaction profile indicative of the undesired quality, and if the interaction profile for the first object is within a specified similarity to the interaction profile indicative of the undesired quality, indicates a follow-up action for the first object. The specified similarity may be of any suitable nature, such as a closeness in magnitude of certain metrics, a number of metrics that are within a certain range, or other similarity. Follow-up action may comprise a human or computer review of the first object, blocking the first object from future search results, or other action. Such blocking may be accomplished, for example, by removing the object from an index from which the search results are drawn, by changing an attribute of the article to keep it from being provide in search results, by including the first object in a list of objects to be filtered from search results, or by other suitable approaches.

Also as mentioned in relation to the examples given, methods according to the present invention may comprise determining a probability that the search result comprises a desirable or undesirable search result based at least in part on the interaction profile. One such method may comprise determining whether the probability indicates an undesirable quality for the search result (such as a spam page). Determining that a search result comprises a desirable search result may comprise determining that the search result probably does not comprise an undesirable search result, or may comprise another suitable action.

As discussed in relation to the example shown in FIG. 6 and otherwise, methods according to the present invention may designate a class of objects, such as a group of objects or a genus of objects, in order to further analysis of, adjustment of, or other interaction with search algorithms and the like. For example, in one embodiment, the first object mentioned above may comprise a class of objects. In one method according to such an embodiment, the method determines the values of the metrics for a plurality of instances of a second object, wherein the second object is at least similar to the class of objects, determines an interaction profile for the second object based at least in part on the values of the metrics for a plurality of instances of the second object, and compares the interaction profile for the first object with the interaction profile of the second object. A quality for the second object may be determined based at least in part on the comparison. This quality may, for instance, indicate that the second object is a good search result when compared with the first object, or may indicate that it is a bad search result when compared with the first object. There are a variety of other methods that may make use of the designation of a group of objects or a genus of objects, in order to further analysis of, adjustment of, or other interaction with various objects.

Another general example of a method according to the present invention comprises receiving click data associated with a search result, and determining a search-result click profile for the search result based at least in part on the click data associated with the search result. The search-result click profile comprises a click profile (a sub-set of interaction profile) for the search result. The click data may comprise click-duration data, multiple-click data, query-refinement data, click-quantity data, or other data that may be used in, or to calculate, data in a click profile, as discussed in the examples given.

Such a method may further comprise analyzing the search-result click profile, and detecting an undesirable search result. A search-result click profile comprises a click profile for a particular search result. The particular search result may be embodied by a URL, a domain, or other object. The detection of an undesirable search result may be accomplished, for example, by detecting an indication that a domain associated with the search result is associated with spam. As discussed in the examples, users often interact with spam pages in a detectable manner.

As mentioned, comparisons of data may be carried out. For example, click data may comprise click data associated with a first search algorithm, and a method according to the present invention may receive click data associated with a search result and a second ranking algorithm (such as click-duration data, multiple-click data, or query-refinement data), determine a second search-result click profile for the search result based at least in part on the click data associated with the search result and the second search algorithm, and compare the first click profile to the second click profile. This comparison may comprise, or the method may further comprise, determining which of the first ranking algorithm and the second ranking algorithm is better.

Analyzing the search-result click profile may comprise weighting the click data. In one embodiment, this may be accomplished by weighting the click data for the magnitude of "goodness" (or desirability) indicated by a particular variable. The ranking of a search result may be adjusted based at least in part on a result of the analysis. Weighting may be accomplished in one embodiment by categorizing the click data into kinds of clicks, determining relative "goodness" indication of the category, and weighting accordingly.

In one method according to the present invention, after receiving click data associated with a search result, the method receives a search result set having the search result, and determines a result-set click profile for the search result set based at least in part on the click data associated with the search result.

As discussed above, there are a variety of ways to use interaction profiles. It should be understood that the examples of uses of profiles given herein are merely examples. In one method of using an interaction profile, a first interaction profile for a first object is identified, and this first interaction profile is based at least in part on click-duration data for the first object, multiple-click data for the first object, and/or query-refinement data for the first object. A second interaction profile may then be identified, and a relative quality of the first and second objects may be determined based at least in part on a comparison of the first interaction profile and the second interaction profile. This relative quality may be that one profile is better than the other on terms previously defined, for example. In some instances, the second interaction profile may comprise an interaction profile indicative of an Undesired quality (such as indicative of a manipulated article, like a spam web page). If it is determined that the first interaction profile is within a specified similarity to the second interaction profile, indicating for example a likelihood that the object associated with the first profile is also a manipulated article, follow-up action for the first object may be set.

In some instances, determining a relative quality of objects comprises determining that a particular quality of the first interaction profile is less than the particular quality of the second interaction profile, and further adjusting a method of providing the first object based at least in part on the determination. For example, a search algorithm that provides the first object may be adjusted based on the determination.

Moreover, after identifying a first interaction profile for a first object (based at least in part on a plurality of metrics comprising click-duration data for the first object, multiple-click data for the first object, and/or query-refinement data for the first object), a method may determine a probability that the first object comprises a desirable object based at least in part on the first interaction profile. The first object may comprise a search result, a group of search results (such as a search result set), or another object. Whether the probability indicates an undesirable attribute for the search result may also be determined by, for example, comparing the probability against probabilities pre-determined (by experiment or otherwise) to indicate an undesirable attribute.

It should be noted that these methods may be carried out for a class of objects. For example, multiple objects may be grouped into a class of objects.

Computer-readable media may be provided that stores executable code for carrying out such methods as described herein. Examples of such media are given above.

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method performed by a system of one or more computers, the method comprising:
   comparing, by the system, a first scoring algorithm for scoring electronic documents responsive to search queries with a second scoring algorithm for scoring the electronic documents responsive to search queries, wherein the comparing includes:
      obtaining a first profile that characterizes historical interaction, by a first plurality of users, with electronic documents in first result sets of electronic documents, the electronic documents in each first result set scored by a search engine in accordance with the first scoring algorithm and ranked by the search engine in each first result set in accordance with said scoring,
      obtaining a second profile that characterizes historical interaction, by a second plurality of users, with electronic documents in second result sets of electronic documents, the electronic documents in each second result set scored by the search engine in accordance with the second scoring algorithm and ranked by the search engine in each second result set in accordance with said scoring,
      determining that one or more metrics of the user interaction characterized in the first profile collectively indicate a higher level of user satisfaction with the first result sets of electronic documents than a level of user satisfaction with the second result sets indicated by the one or more metrics of the user interaction characterized in the second profile, and
      in response to the determination, outputting an indication that the first scoring algorithm is better than the second scoring algorithm,
   wherein the one or more metrics of the user interaction characterized in the first profile comprise a total number of respective selections of one or more electronic documents from each of the first result sets of electronic documents,
   wherein the one or more metrics of the user interaction characterized in the second profile comprise a total number of respective selections of one or more electronic documents from each of the second result sets of electronic documents, and
   wherein the higher level of user satisfaction is indicated by a lower total number of respective selections of the one or more electronic documents from each of the first result sets of electronic documents than the total number of respective selections of the one or more electronic documents from each of the second result sets of electronic documents.

2. The method of claim 1, wherein:
   the one or more metrics of the user interaction further comprise a number of refinements of the search queries; and
   the higher level of user satisfaction is further indicated by a lower number of refinements by the first plurality of users or the second plurality of users.

3. The method of claim 1, wherein:
   the one or more metrics of the user interaction characterized in the first profile further comprise a first ratio of long duration selections of electronic documents from the first result sets of electronic documents to short duration selections of electronic documents from the first result sets of electronic documents;
   the one or more metrics of the user interaction characterized in the second profile further comprise a second ratio of long duration selections of electronic documents from the second result sets of electronic documents to short duration selections of electronic documents from the second result sets of electronic documents; and
   the higher level of user satisfaction is further indicated by the first ratio being greater than the second ratio.

4. The method of claim 1, wherein:
   the first profile characterizes one or more respective interactions with electronic documents in each of the first result sets of electronic documents responsive to search queries of a first category,
   the search queries of the first category are selected from among a plurality of queries including the search queries of the first category and other search queries,
   the second profile characterizes one or more respective interactions with electronic documents in each of the second result sets of electronic documents responsive to search queries of the first category, and
   the indication indicates that the first scoring algorithm is better than the second scoring algorithm for scoring electronic documents responsive to search queries of the first category.

5. The method of claim 4, wherein the first category is navigational queries, commercial queries, long queries, short queries, or general queries.

6. The method of claim 4, wherein the first category is queries having syntax.

7. The method of claim 4, wherein obtaining the first profile comprises accessing, for each of a plurality of search queries of the first category:
   data characterizing one or more properties of a session in which the respective search query was submitted to the search engine and results returned in response to the submission of the respective search query,
   data characterizing one or more properties of the respective search query, and
   data characterizing one or more properties of the returned results.

8. A system comprising:
   one or more computers programmed to perform operations, the operations comprising:
   comparing, by the system, a first scoring algorithm for scoring electronic documents responsive to search queries with a second scoring algorithm for scoring the electronic documents responsive to search queries, wherein the comparing includes:
      obtaining a first profile that characterizes historical interaction, by a first plurality of users, with electronic documents in first result sets of electronic documents, the electronic documents in each first result set scored by a search engine in accordance with the first scoring algorithm and ranked by the search engine in each first result set in accordance with said scoring,
      obtaining a second profile that characterizes historical interaction, by a second plurality of users, with electronic documents in second result sets of electronic documents, the electronic documents in each second result set scored by the search engine in accordance with the second scoring algorithm and ranked by the search engine in each second result set in accordance with said scoring,
      determining that one or more metrics of the user interaction characterized in the first profile collectively indicate a higher level of user satisfaction with the first result sets of electronic documents than a level of user satisfaction with the second result sets indicated by the one or more metrics of the user interaction characterized in the second profile, and in response to the determination, outputting an indication that the first scoring algorithm is better than the second scoring algorithm, wherein the one or more metrics of the user interaction characterized in the first profile comprise a total number of respective selections of one or more electronic documents from each of the first result sets of electronic documents, wherein the one or more metrics of the user interaction characterized in the second profile comprise a total number of respective selections of one or more electronic documents from each of the second result sets of electronic documents, and wherein the higher level of user satisfaction is indicated by a lower total number of respective selections of the one or more electronic documents from each of the first result sets of electronic documents than the total number of respective selections of the one or more electronic documents from each of the second result sets of electronic documents.

9. The system of claim 8, wherein:

the first profile characterizes one or more respective interactions with electronic documents in each of the first result sets of electronic documents responsive to search queries of a first category, the search queries of the first category are selected from among a plurality of queries including the search queries of the first category and other search queries, the second profile characterizes one or more respective interactions with electronic documents in each of the second result sets of electronic documents responsive to search queries of the first category, and the indication indicates that the first scoring algorithm is better than the second scoring algorithm for scoring electronic documents responsive to search queries of the first category.

10. The system of claim 9, wherein the first category is navigational queries, commercial queries, long queries, short queries, or general queries.

11. The system of claim 9, wherein the first category is queries having syntax.

12. The system of claim 9, wherein obtaining the first profile comprises accessing, for each of a plurality of search queries of the first category:

data characterizing one or more properties of a session in which the respective search query was submitted to the search engine and results returned in response to the submission of the respective search query, data characterizing one or more properties of the respective search query, and data characterizing one or more properties of the returned results.

13. The system of claim 8, wherein:

the one or more metrics of the user interaction characterized in the first profile further comprise a first ratio of long duration selections of electronic documents from the first result sets of electronic documents to short duration selections of electronic documents from the first result sets of electronic documents;

the one or more metrics of the user interaction characterized in the second profile further comprise a second ratio of long duration selections of electronic documents from the second result sets of electronic documents to short duration selections of electronic documents from the second result sets of electronic documents; and the higher level of user satisfaction is further indicated by the first ratio being greater than the second ratio.

14. The system of claim 8, wherein:

the one or more metrics of the user interaction further comprise a number of refinements of the search queries; and the higher level of user satisfaction is further indicated by a lower number of refinements by the first plurality of users or the second plurality of users.

* * * * *